US012147030B2

(12) United States Patent
Zhou et al.

(10) Patent No.: US 12,147,030 B2
(45) Date of Patent: Nov. 19, 2024

(54) OPTICAL PACKAGE HAVING TUNABLE FILTER

(71) Applicant: II-VI Delaware, Inc, Wilmington, DE (US)

(72) Inventors: Jiang-Huai Zhou, Windham, NH (US); Glenn D Bartolini, Waltham, MA (US)

(73) Assignee: II-VI DELAWARE, INC., Wilmington, DE (US)

( * ) Notice: Subject to any disclaimer, the term of this patent is extended or adjusted under 35 U.S.C. 154(b) by 389 days.

(21) Appl. No.: 17/317,059

(22) Filed: May 11, 2021

(65) Prior Publication Data
US 2022/0365339 A1 Nov. 17, 2022

(51) Int. Cl.
| | |
|---|---|
| *G02B 26/08* | (2006.01) |
| *G01J 3/26* | (2006.01) |
| *G02B 7/188* | (2021.01) |
| *G02B 26/00* | (2006.01) |
| *G02B 26/02* | (2006.01) |

(52) U.S. Cl.
CPC ............ *G02B 26/0875* (2013.01); *G01J 3/26* (2013.01); *G02B 7/188* (2013.01); *G02B 26/001* (2013.01); *G02B 26/02* (2013.01)

(58) Field of Classification Search
CPC .. G02B 26/0875; G02B 7/188; G02B 26/001; G02B 26/02; G02J 3/26
USPC .......................................................... 359/578
See application file for complete search history.

(56) References Cited

U.S. PATENT DOCUMENTS

| | | | |
|---|---|---|---|
| 6,438,149 | B1 | 8/2002 | Tayebati et al. |
| 6,509,972 | B2 | 1/2003 | Korn |
| 6,597,490 | B2 | 7/2003 | Tayebati |
| 6,608,711 | B2 | 8/2003 | Flanders et al. |
| 6,810,062 | B2 | 10/2004 | Kuznetsov |
| 9,384,853 | B2 | 7/2016 | Jang |
| 2001/0028503 | A1* | 10/2001 | Flanders ................... G01J 3/26 |
| | | | 359/578 |
| 2002/0126726 | A1* | 9/2002 | Flanders ............ G02B 26/0875 |
| | | | 372/101 |

(Continued)

OTHER PUBLICATIONS

Spectral Engines, Spectrometer Performance at Sensor Price Point, dated Aug. 15, 2014, 15 pages.

(Continued)

*Primary Examiner* — Sharrief I Broome
(74) *Attorney, Agent, or Firm* — Blank Rome LLP

(57) ABSTRACT

An optoelectronic device, including a tunable optical filter or tunable optical filter with photodiode, uses voltage differentials to filter an optical signal passing along an optical path. A membrane has an electrode and is disposed adjacent a fixed mirror and another. A central portion of the membrane is distanced from the fixed mirror and has an aperture in which a second mirror is disposed. This second mirror translates with the membrane at a freespace gap relative to the fixed mirror when the electrodes are subject to the voltage differentials. In turn, the freespace gap is configured as a Fabry-Perot etalon to pass one or more spectral frequencies of the optical signal along the optical path. The membrane is shaped and reinforced to limit possible bowing. The translatable mirror in the aperture of the membrane is also shaped and reinforced to limit it from possible bowing as well.

21 Claims, 13 Drawing Sheets

(56) References Cited

U.S. PATENT DOCUMENTS

| | | | | |
|---|---|---|---|---|
| 2003/0072009 | A1* | 4/2003 | Domash | G01J 3/0286 |
| | | | | 356/519 |
| 2004/0076198 | A1* | 4/2004 | Spoonhower | H01S 5/18366 |
| | | | | 372/39 |
| 2006/0077155 | A1* | 4/2006 | Chui | G02B 26/001 |
| | | | | 345/85 |
| 2007/0041703 | A1* | 2/2007 | Wang | B81C 1/00666 |
| | | | | 385/147 |
| 2007/0121118 | A1* | 5/2007 | Gally | G02B 26/001 |
| | | | | 356/477 |
| 2008/0094686 | A1* | 4/2008 | U'Ren | B81B 3/0072 |
| | | | | 359/291 |
| 2008/0186581 | A1* | 8/2008 | Bita | G02B 26/001 |
| | | | | 359/578 |
| 2015/0036146 | A1* | 2/2015 | Staloff | A61B 1/0008 |
| | | | | 356/479 |
| 2015/0043002 | A1* | 2/2015 | Kuznetsov | G02B 26/001 |
| | | | | 356/402 |
| 2022/0128406 | A1* | 4/2022 | Cahill | G01J 3/26 |

OTHER PUBLICATIONS

Faraone, et al., Infrared micro-spectrometers for low-cost, portable applications, The International Society for Optical Engineering, copyright 2006, 2 pages.

Kundu, et al., "Investigation of Optical Flatness of Stretched Membrane Drum-Type Micromirror," Journal of Lightwave Technology, 2012, 30:10:1377-1385.

Sankisa, et al., "Analysis and Fabrication of Fabry-Perot Interferometer Filters Using MEMS Technology," LWJ6.pdf, copyright 2007, 1 page.

Spectral Engines, "N-Series Spectral Sensors," Brochure, undated, obtained from www.spectralengines.com, file created Feb. 5, 2015, 1-pg.

Wei, et al., Finite Element Analysis of MEMS Based Fabry-Perot Optical Filter with Electrostatic Actuation, Optical Society of America, copyright 2008, 3 pages.

Hamamatsu, "MEMS-FPI spectrum sensors, spectroscopic modules," Technical Note, dated Sep. 10, 2020; 47-pgs.

* cited by examiner

OPTICAL PACKAGE HAVING TUNABLE FILTER

BACKGROUND OF THE DISCLOSURE

Tunable optical filters in the form of Fabry-Perot Interferometers are used in a variety of applications, including spectroscopy, telecommunications, wavelength selection in Dense Wavelength Division Multiplexing (DWDM) systems, monitoring optical performance, optical spectrum analysis, etc. For example, a tunable optical filter can be used in an optical channel monitor (OCM). The tunable optical filter in the monitor can scan an incoming optical signal across a predetermined wavelength range of interest for a set of channels associated with that signal. A photodiode detects the output from the tunable optical filter, and signal processing can then be used to correct/control individual channels of a network management system (NMS) or the like.

One type of tunable optical filter is a thermo-optically tunable, thin-film filter, such as disclosed in U.S. Pat. No. 6,985,281, which is incorporated herein by reference. This type of device is made from amorphous semiconductor materials and exploits the large thermo-optic coefficient of these materials to tune the transmission wavelength of the filter.

Another type of tunable optical filter is a microelectromechanical systems-Fabry Perot Interferometer (MEMS-FPI) that uses applied voltage to vary the transmission wavelength of the filter. Combined with a photodiode in a single package, such a tunable filter can be used for a number of applications. A typical configuration for a MEMS-FPI tunable optical filter has a hemispherical resonant cavity in which a fixed mirror is flat or near planar and in which a movable mirror is curved (i.e., spherical, parabolic).

Although current tunable optical filters may be effective, they may tend to require higher voltages to operate. Moreover, existing tunable optical filters may not provide a wide range of tuned frequencies due to structural limitations of the filters' components. This can limit the applications in which the tunable optical filter can be used and can reduce the resolution of the frequencies produced.

The subject matter of the present disclosure is directed to overcoming, or at least reducing the effects of, one or more of the problems set forth above.

SUMMARY OF THE DISCLOSURE

An optoelectronic device disclosed herein is used to filter an optical signal passing along an optical path from a fiber. The device comprises a first mirror, a membrane, a second mirror, and first and second electrodes. The first mirror is disposed in the optical path and being planar, and the membrane is movable relative to the first mirror. The second mirror is disposed on the membrane and is translatable with the movement of the membrane relative to the first mirror. The first and second electrodes are disposed relative to one another adjacent the first mirror and the membrane. The first and second mirrors defines a resonant cavity of a Fabry-Perot etalon configured to filter the optical signal along the optical path. The first and second electrodes are configured to tune the resonant cavity.

The second mirror has alternating layers stacked with alternating higher and lower refractive indices. Each of the layers has at least one structural parameter, which is configured to reduce the "curvature" (i.e., increase a radius of curvature) of the second mirror. The reduced "curvature" is configured to suppress a side mode of the optical signal. The reduced "curvature" (when combined with an aperture) can increase a working distance between the device and the fiber. Moreover, the device can comprise a sensor disposed in the optical path and configured to detect the one or more spectral frequencies passed. The sensor can comprises a wide receiver area being suited to the suppressed side mode of the optical signal.

A method is disclosed herein for assembling an optoelectronic device that uses voltage differentials to filter an optical signal passing along an optical path from a fiber. In the method, a tunable filter is formed by: forming a first mirror on a first side of a substrate; forming a membrane at least partially on the first side of the substrate; and forming, in an aperture of the membrane, a second mirror having a plurality of alternating layers stacked with alternating higher and lower refractive indices, each of the layers having at least one structural parameter, by configuring the at least one structural parameter for one or more of the layers to reduce a "curvature" of the second mirror (i.e., increase a radius of curvature of the second mirror). The method further comprises arranging the tunable filter relative to a sensor in the optoelectronic device with the reduced curvature suppressing a side mode of the optical signal. The method can further comprises arranging the tunable filter in the optoelectronic device at an increased working distance between the second mirror and the fiber based on the reduced curvature of the second mirror and the selection of an appropriate aperture.

The foregoing summary is not intended to summarize each potential embodiment or every aspect of the present disclosure.

DETAILED DESCRIPTION OF THE DISCLOSURE

Figure 1:
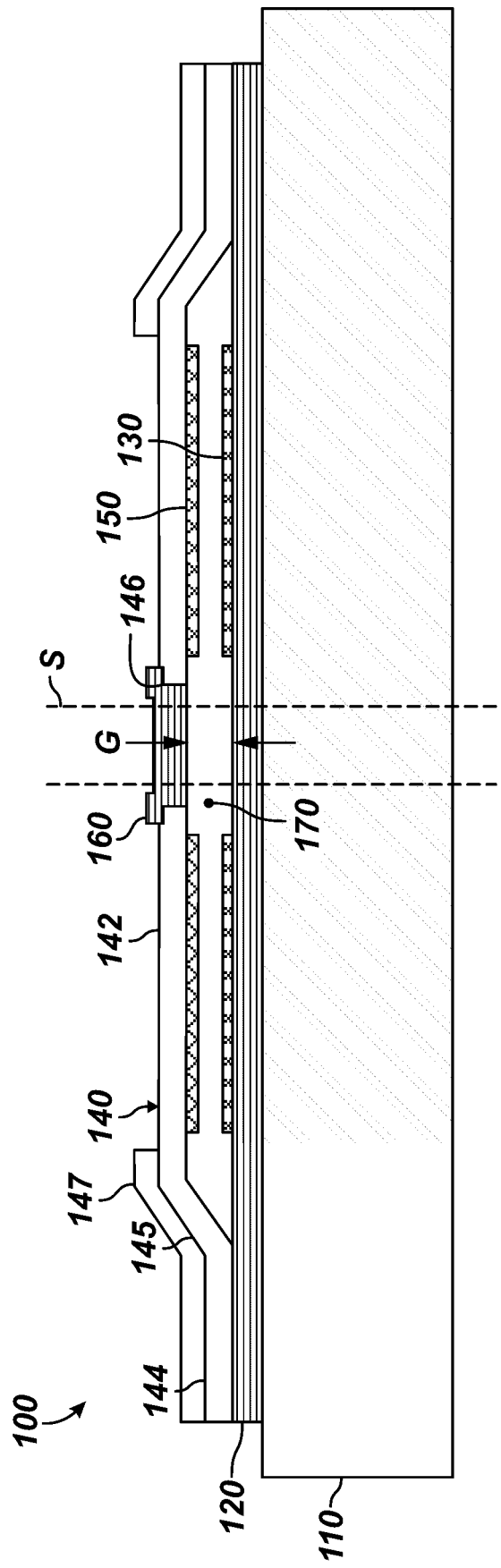
FIG. 1 illustrates a schematic side view of an optoelectronic device of the present disclosure to filter an optical signal.

FIG. 1 illustrates a schematic side view of a tunable optical filter 100 of the present disclosure to filter an optical signal S. The device 100 includes a substrate 110, a first distributed Bragg reflector (DBR) or bottom mirror 120, a first electrode 130, a membrane 140, a second electrode 150, and a second DBR or top mirror 160. Using voltage differentials between the two electrodes 130, 140, the optical filter 100 can alter a separation or freespace gap G between the two mirrors 120, 160, which in turn changes the selected band in the optical signal S passing along an optical path. (To avoid confusion in later discussions, reference to "top" and "bottom" is merely made for convenience. In fact, the tunable optical filter 100 may preferably be arranged in a flip-chip configuration, and an optical signal may pass through the first mirror 120 as an input side of the filter 100 to the second mirror 160 as an output side of the filter 100.)

The first mirror 120 is fixed and disposed on one side of the substrate 110 and is disposed in the optical path of the signal S. The first electrode 130 is disposed partially on a first side of the fixed mirror 120, leaving a central area of the fixed mirror 120 exposed for passage of the optical signal S. One or more contacts (not shown) can be connected to the first electrode 130 for making electrical contact in an assembly (not shown).

The membrane 140 is disposed on the fixed mirror 120 and at least a portion of the first electrode 130. At least a central portion 142 of the membrane 140 is distanced from the fixed mirror 120 and can be translated relative to the fixed mirror 120 by the tuning of the electrodes 130, 150.

A perimeter portion 144 of the membrane 140 is disposed on the fixed mirror 120, and a ledge 145 transitions from the perimeter portion 144 to the central portion 142 distanced from the fixed mirror 120. The central portion 142 defines an aperture 146 therethrough having the second mirror 160, which is translatable with the movement of the membrane 140.

The second electrode 150 disposed partially on the inside of the membrane 140 adjacent the first electrode 130, leaving a central area for the first mirror 160 and for passage of the optical signal S. One or more contacts (not shown) can be connected to the second electrode 150 for making electrical contact in an assembly (not shown). All of the various contacts can be disposed on the same side of the tunable filter 100, which permits the filter 100 to be mounted in a flip-chip arrangement in an assembly as discussed below.

The second mirror 160 disposed in the aperture 146 of the membrane 140 can move with the flexing, bending, etc. of the membrane 140 relative to the first mirror 120, when a voltage differential is applied between the first and second electrodes 130, 140. As shown in general, the second mirror 160 comprises first and second opposing faces. A perimeter of the second mirror 160 can define a lip engaging an outside surface of the membrane 140 adjacent the aperture 146.

In use, the first and second electrodes 130, 150 can be subject to defined voltage differentials that are configured to produce defined separations or gaps G in the freespace or air cavity separating the first and second mirrors 120, 130. In particular, the applied voltage produces an electrostatic force between the tuning electrodes 130, 150 that adjusts the gap G. Acting as a Fabry-Perot resonator cavity 170, the defined gap G is configured as a Fabry-Perot etalon (FPE) to pass one or more spectral frequencies of the optical signal S along the optical path. Electrical fields are established across an electrostatic cavity between the first and second electrodes 130, 150 that creates forces to deflect the membrane 142 out-of-plane and therefore tunes the filter 100 by modulating the gap G of the resonator cavity 170.

As is known, a Fabry-Perot etalon (FPE) is a type of optical filter that can pass a band of light from an input spectrum. The frequency (wavelength) of the light selected is dependent upon the length of the gap G. As will be appreciated, for example, this is achieved by defining the gap G at particular values of $m\lambda/2$, where m is an integer, so that a transmission wavelength $\lambda$ is allowed to pass through.

In operation of the tunable optical filter 100, the translatable mirror 160 is moved closer to the fixed mirror 120 when a voltage differential is applied to the opposing electrodes 130, 150. This alters the gap G between the mirrors 120, 160 and tunes the frequency that is selected by the FPE. The required tuning voltage is intended to be lower compared to other microelectromechanical system (MEMS) devices used in optical filtering. The tunable optical filter 100 can also be used in an input spectrum of C-band 1530-1565 (nm) and L-band 1565-1625 (nm). As discussed in more detail later, the tunable filter 100 has a half-symmetric resonator cavity 170 formed by a substantially planar mirror 120 and a slightly curved mirror 160 having low or reduced curvature (i.e., a larger radius for its curvature). Reduced curvature can equate to limited, diminished, lessened, lowered, etc. curvature of the second mirror so that the second mirror is more flat or planar. As will be appreciated, "curvature" is a relative term. In general, "curvature" is related to the "bow" of the mirror 160 or the "radius of curvature (ROC)" of the mirror 160. The "bow" of the mirror 160 is related to the ROC of the mirror 160, but depends on the specific area of the film that makes up the mirror 160. In that sense, the ROC of the mirror 160 is a more general measure of the "curvature" of the mirror 160 because it does not depend on the area of the film. For a given implementation, the ROC of the mirror can be at least 10-mm. Therefore, reference to "curvature," "bow," and the like as used herein may more accurately relate to a measure of a "radius of curvature," whereby a larger radius of curvature for the mirror 160 produces a flatter mirror 160 with less "curvature" or "bow."

Figure 2A:
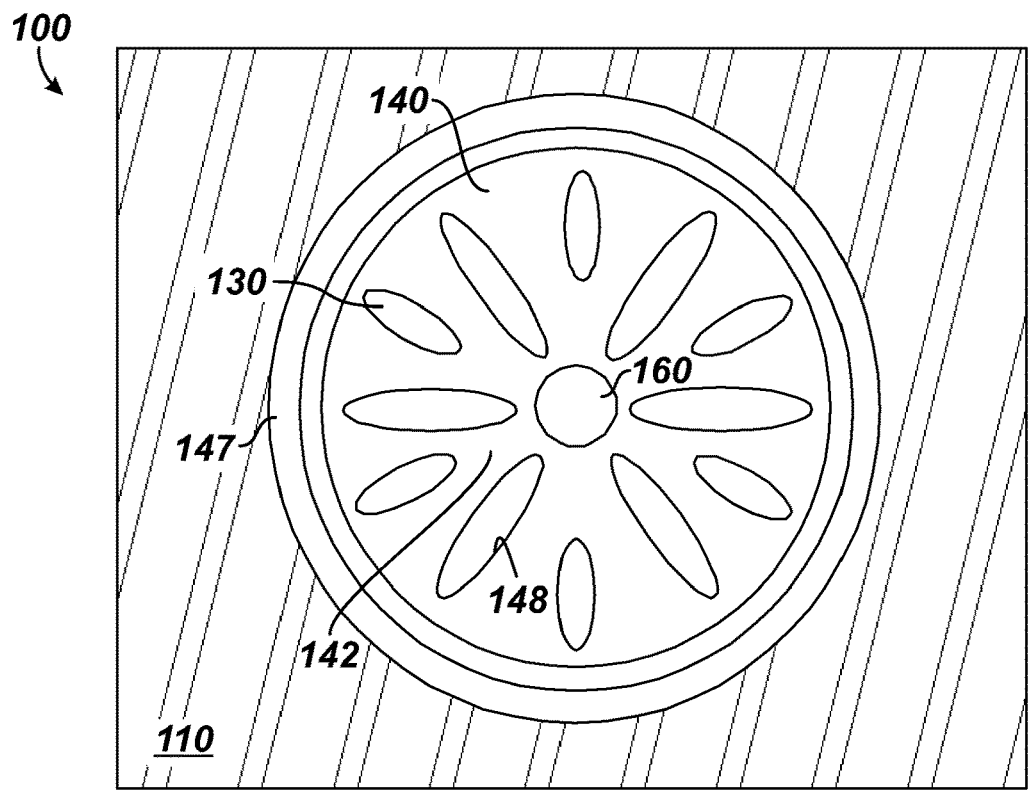
FIGS. 2A-2B illustrate plan views of the optoelectronic device of the present disclosure.

FIG. 2A illustrates a plan view of the tunable optical filter 100 of the present disclosure. As can be seen, the central portion 142 of the membrane 140 is circular, and the second (translatable) mirror 160 is disposed in the center of the central portion 142. Reliefs 148 are defined in a pattern in the central portion 142 for providing flexure. Various types of reliefs 148 can be used, including divots, wells, holes, grooves, and the like, and the reliefs 148 can be arranged in various patterns as desired.

Figure 2B:
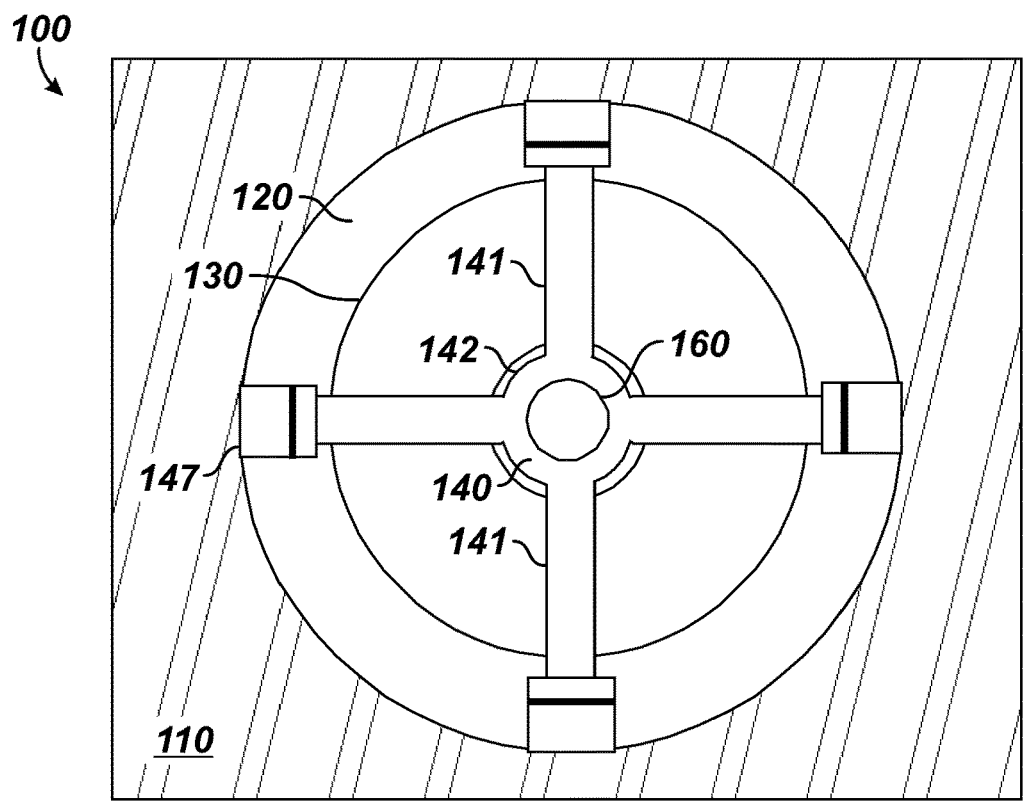

FIG. 2B illustrates a plan view of the tunable optical filter 100 of the present disclosure having a tethered structure. As can be seen, the central portion 142 of the membrane 140 is circular, and the second (translatable) mirror 160 is disposed in the center of the central portion 142. Outside the central portion 120, the membrane 140 forms tethers 141 for providing flexure that extend to the support 147 on the bottom mirror 120. As shown, the bottom mirror 120 includes the bottom electrode 130, which opposes the upper electrode (not shown) formed on the underside of the tethers 141. Four tethers 141 are shown with quarter-circle reliefs in a pattern between them. Other tethered arrangements are possible.

Figure 3:
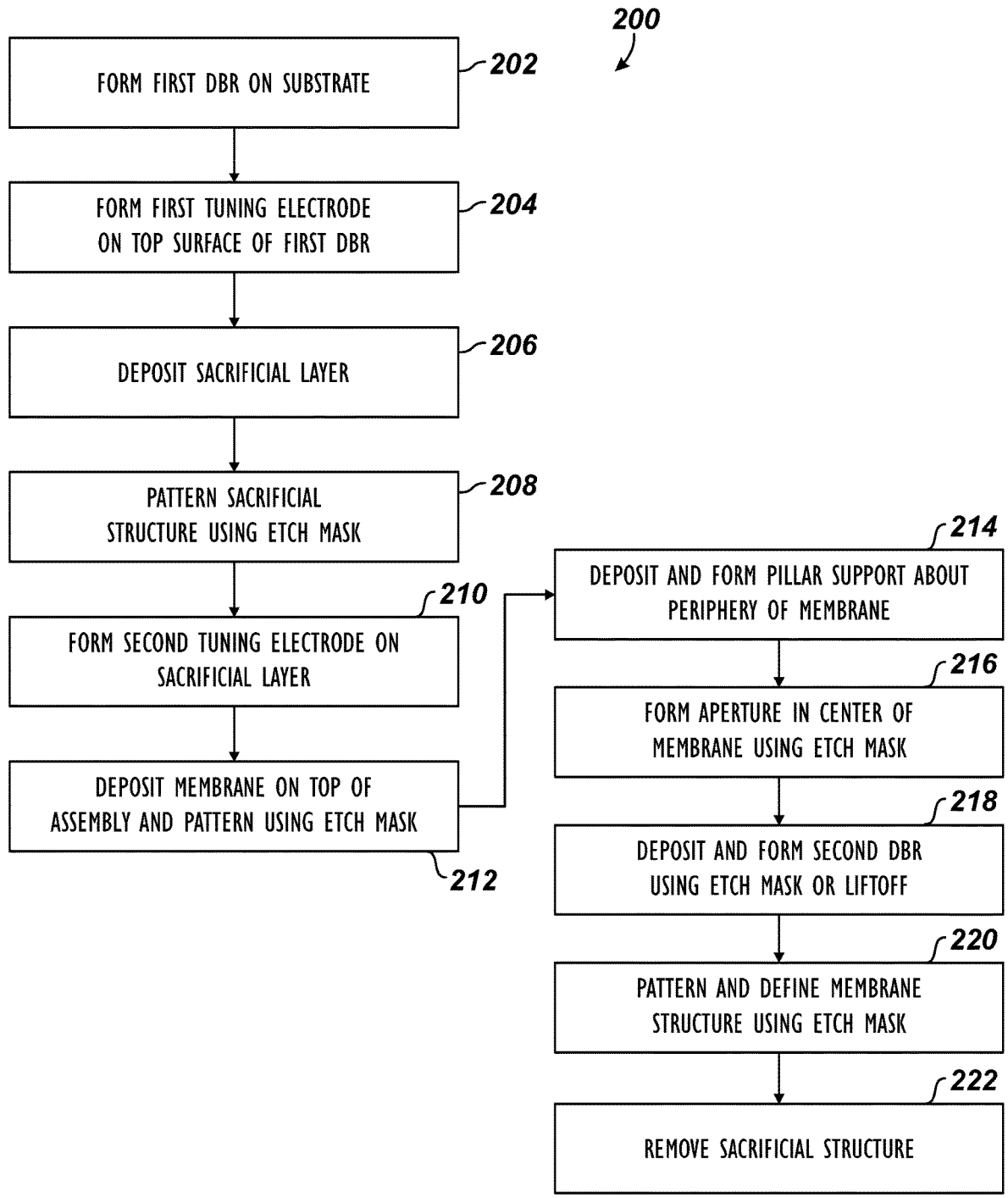
FIG. 3 illustrates a flow chart outlining the steps for fabricating a thin film structure of a tunable optical filter of the present disclosure.

FIG. 3 shows a flow chart outlining a process 200 for fabricating the thin film structure of the tunable optical filter 100 of the present disclosure. Reference is also made to FIGS. 4A to 4F showing various stages in the fabrication of the filter 100.

Starting with a larger substrate 110, multiple dies for tunable optical filters 100 can be fabricated on the same substrate. For example, in manufacturing the tunable filter 100, a wafer composed of tunable filter chips is fabricated and is given an anti-reflective (AR) coating. The tunable filters 100 are compact and can be monolithically fabricated in large, dense arrays on a wafer-scale. Chips capable of C+L or other bands of operation can be selected, probed, and mounted into TO packages, as disclosed herein.

Only one such filter 100 is described for simplicity. As will be appreciated, the substrate 110 can be composed of a suitable material, such as silicon, GaAs, sapphire, and the like, for transmission of the optical signal therethrough.

Figure 4A:
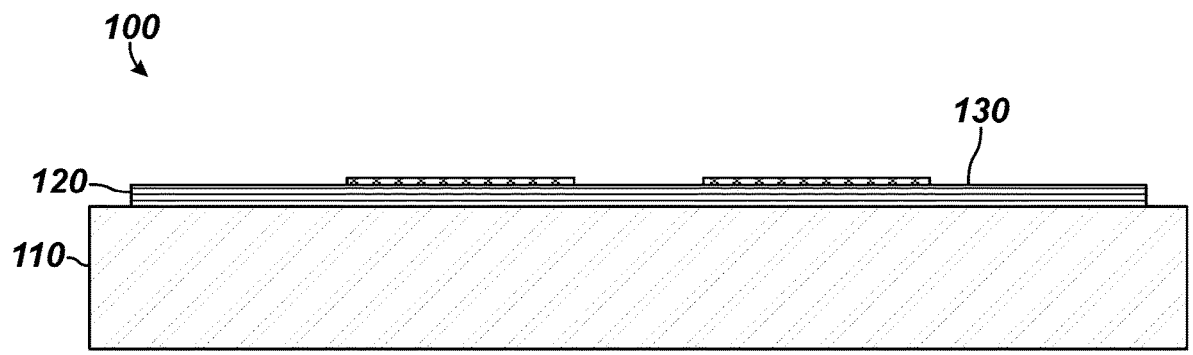
FIGS. 4A to 4F illustrate different stages in the fabrication of the disclosed tunable optical filter.

As shown in FIG. 4A, the first (fixed) mirror 120 is composed of dielectric films formed on the substrate 110 using conventional techniques (Block 202). In particular, the films of dielectric material have alternating refractive indices and are stacked to form the desired properties of a distributed Bragg reflector (DBR). In general, the dielectric films can be composed of $SiO_2$, $Al_2O_3$; $TiO_2$; MgO; $Ta_2O_5$; zirconium oxide; SiN, amorphous Si, or suitable semiconductor materials.

As shown in FIG. 4A, the first tuning electrode 130 is then formed on the top surface of the first DBR or bottom mirror 120 (Block 204). The first tuning electrode 130 can be composed of a suitable metal material. The deposition of the electrode 130 can use known techniques, such as an etch-mask process. Alternatively, the first tuning electrode 130 can be formed directly on the substrate before the first DBR 120 or embedded in the first DBR 120. These alternatives may lower the tuning efficiency, which can be desirable for certain applications. Any contacts for the first electrode 130 can also be formed. Should it be necessary, a layer of an electric insulation (not shown) can be deposited atop some or all of the electrode 130.

Figure 4B:
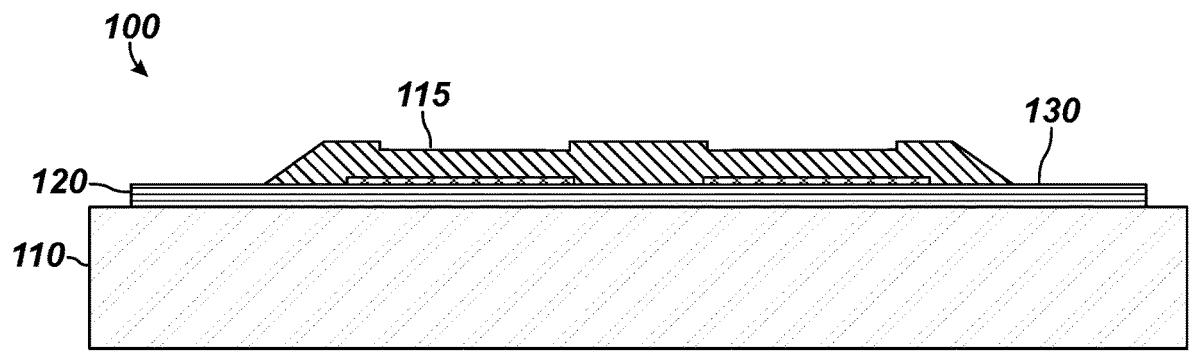

As shown in FIG. 4B, a layer of sacrificial material is then deposited on top of the assembly over portions of the first mirror 120 and first tuning electrode 130 to form a sacrificial structure 115 (Block 206). The sacrificial structure 115 can be composed of polyimide, aluminum, or other removable material. Because the structure 115 will act to space the membrane's central portion (142), the upper electrode (150), and the translatable mirror (160) during assembly steps, the structure 115 is shaped and patterned using an etch-mask process (Block 208).

In particular, sidewalls of the sacrificial structure 115 can be defined to provide a slanted transition for the membrane's peripheral portion to the lifted central portion (142). The shape, size, and thickness of the sacrificial structure 115 are controlled to provide the desired dimensions for the precise operation of the tunable filter 100.

Figure 4C:
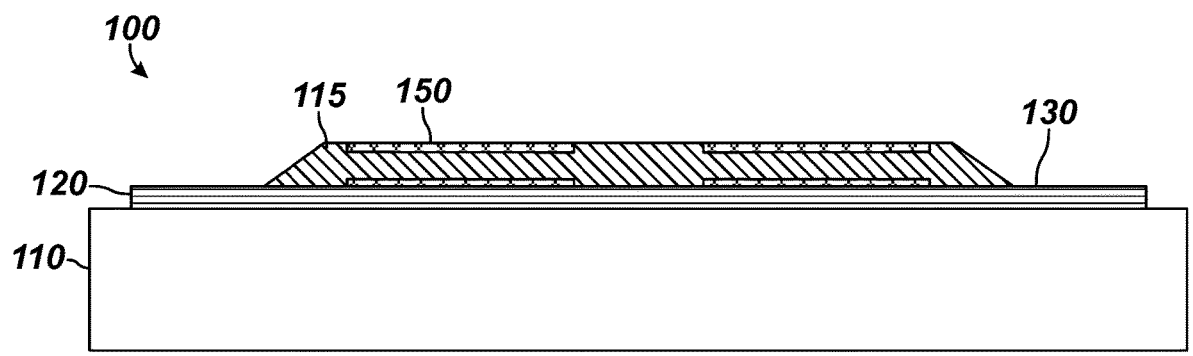

As shown in FIG. 4C, the second (upper) tuning electrode 150 is then formed on the sacrificial structure 115 (Block 210). The second electrode 150 can be composed of a suitable metal material, and the deposition of the electrode 150 can use known techniques, such as an etch-mask process. Alternatively, the second tuning electrode 150 can be formed embedded in the membrane 140 or on the top surface of the membrane 140. These alternatives may lower the tuning efficiency, which can be desirable for certain applications. Any contacts for the second electrode 150 can also be formed.

Figure 4D:
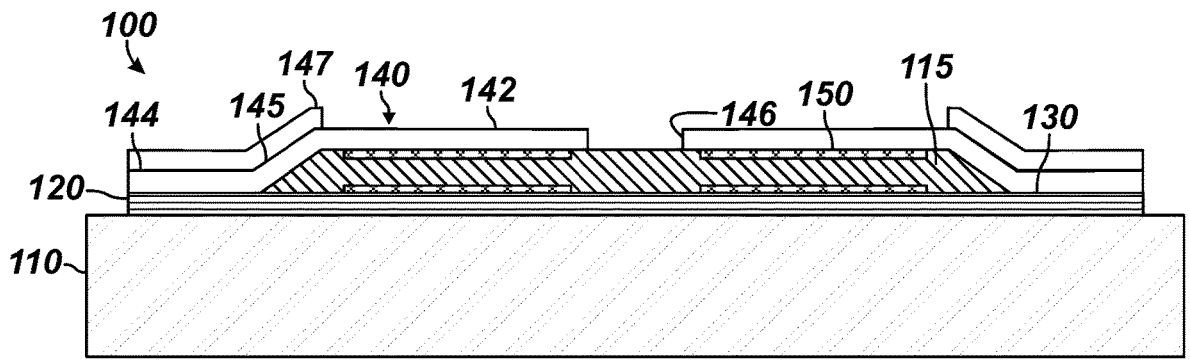

As shown in FIG. 4D, the membrane 140 is then deposited on top of the assembly over the exposed portions of the sacrificial structure 115, the upper and lower tuning electrodes 130, 150, the fixed mirror 120, and the like (Block 212). Any candidate material for the membrane 140 would be compatible with the electrode 150. As an example, the membrane 140 can be a dielectric or semiconductor thin film, such as Si dioxide, Si nitride, amorphous Si, and Si oxynitride ($SiO_xN_y$). The membrane 140 is also patterned using an etch-mask process (Block 212).

A pillar support or reinforcement 147 is then deposited about the periphery of the membrane 140 (Block 214). The pillar support 147 can be composed a layer of metal material, such as aluminum or titanium tungsten, or can be composed of a hard dielectric, such as silicon nitride. When the assembly is completed, the pillar support 147 provides lateral support to the raised, central portion 142 of the membrane 140 and can counteract the central portion's tendency to bow convexly on the finished assembly. Shaping of the pillar support 147 can be performed using an etch-mask process.

An aperture 146 for the top mirror 160 is then formed through the membrane 140 to the sacrificial structure 115 (Block 216). An etch-mask process may be used to define these features.

Figure 4E:
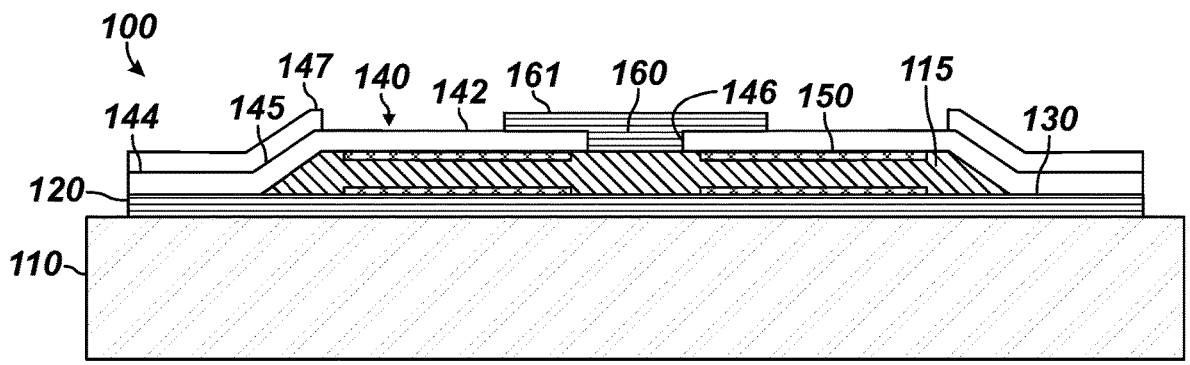

At this point as shown in FIG. 4E, the fabrication process 200 proceeds with forming the second DBR or translatable mirror 160 on the assembly (Block 218). To do this, dielectric films or layers 161 of alternating refractive indices are layered over the aperture 146 on the membrane 140 and successively on each other by blanket coating using Plasma activated Chemical Vapor Deposition (PCVD) or Plasma Enhanced Chemical Vapor Deposition (PECVD). The dielectric layers 161 fill the aperture 146 and extend out over the exposed membrane 140 about the aperture 146. The second mirror 160 is then formed by etching the layers 161. (Because the drawings are schematic, it will be appreciated that any give feature is not necessarily governed by the locations shown in the figures.)

As will be appreciated, the second mirror 160 can be composed of dielectric coatings comparable to the first mirror 120. Using either an etch-mask process or liftoff, the second mirror 160 is formed so that its shape has an overlapping lip about the aperture 146. As disclosed herein, the overlapping lip of the top mirror 160 is also provided with a peripheral rim, which provides lateral support to the second mirror 160. In general, the lip and rim may help counteract a tendency of the second mirror 160 to bow convexly on the finished assembly. However, as disclosed in more detail below, the structural features of the layers that make up the second mirror 160 give the second mirror 160 a low or reduced curvature (i.e., increased radius of curvature), which has a number of benefits for an optical device as disclosed herein.

The membrane 140 is then further patterned and defined using an etch-mask process (Block 220). For example, any reliefs (148) can be formed in the membrane 140. The reliefs (148) provide openings for etchants to selectively remove the underlying sacrificial material of the structure 115 in later steps of the fabrication. Once complete, the sacrificial structure 115 is then removed using a suitable dry-etching technique, such as an oxygen plasma process (Block 222). In the end, the central portion 142 of the membrane 140 is supported at a lifted distance from the bottom mirror 120 so the tunable gap G exists between the first and second mirrors 120, 160 for the purposes disclosed herein. The optical filter 100 can then be integrated with other components in an optoelectrical device disclosed herein.

Figure 4F:
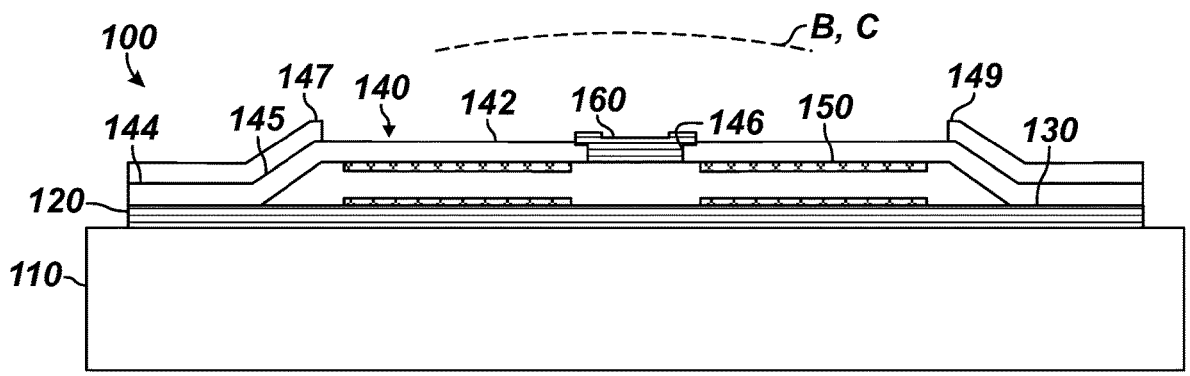

As shown in FIGS. 1 and 4F, the membrane 140 includes the perimeter portion 144, which is disposed on the first mirror 120 and includes the central portion 142 that is raised from the perimeter portion 144 so that the central portion 142 is distanced from the first mirror 120. A ledge 145 transitions from the perimeter portion 144 to the central portion 142. The outer perimeter of this ledge 145 is formed by the pillar support 147 that produces a ridge 149 extending a height beyond a planar surface of the central portion 142. The ridge 149 of the pillar support 147 provides lateral support to the central portion 142 and tends to counteract a tendency of the central portion 142 to bow with a convexity away from the bottom mirror 120. In other words, the ridge 149 of the pillar support 147 can provide a concavity to the central portion 142 to counteract bowing (B; FIG. 4F).

As already discussed, operation of the tunable optical filter 100 of FIG. 1 involves applying the voltage differential between the electrodes 130, 150 to tune the optical filter 100 and to thereby alter the position of the membrane 140 and the translatable mirror 160 supported thereon. This alters the tunable gap G between the two mirrors 120, 160, thereby altering the frequency of the spectral signal S passable through the filter 100. The structure of the membrane 140, the pillar support 147, and the translatable mirror 160 outlined above give the optical filter 100 a large range of tuning without significant spectral distortion of the spectral signal S. Moreover, the structure of the membrane 140, the pillar support 147, and the translatable mirror 160 helps prevent the formation of a metastable position in the assembly, which would limit the tuning range of the optical filter 100 and would limit its ability to filter a wider frequency range, such as C+L bands noted herein.

Figure 5:
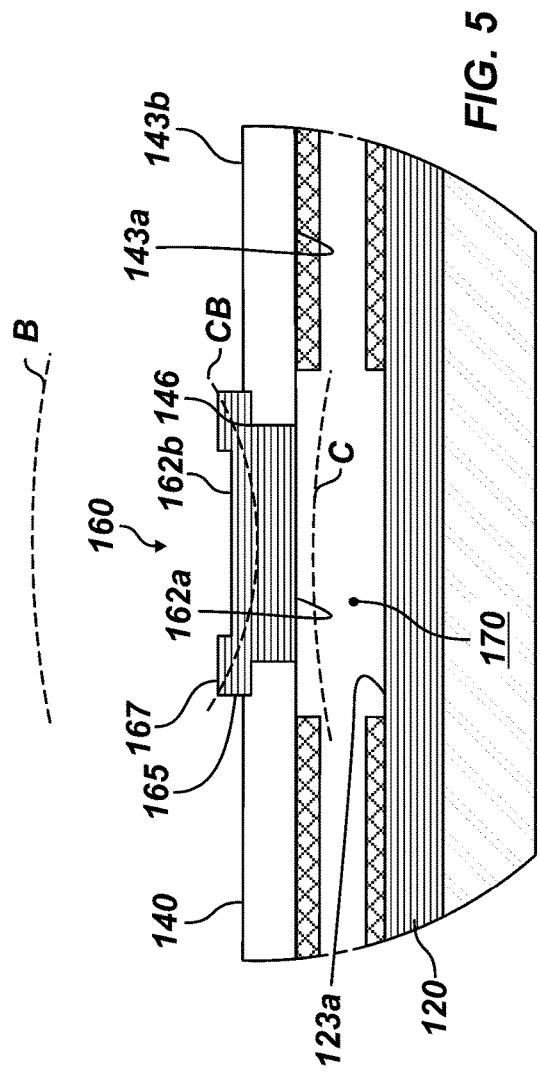
FIG. 5 illustrates a detail of the tunable optical filter.

FIG. 5 illustrates a schematic detail of the tunable optical filter (100), showing features of the translatable mirror 160 that achieve some of these advantages. As noted, the translatable mirror 160 disposed in the aperture 146 of the central portion 142 of the membrane 140 is translatable with the movement of the central portion 142 relative to the fixed mirror 120. As shown in the center of the central portion 142, the translatable mirror 160 is formed in the aperture 144 and has its rim or lip 165 extending over the top surface of the membrane 140.

As labelled, the translatable mirror 160 has a first face 162a facing the fixed mirror 120 and has a second face 162b opposing the first face 162a. The rim or lip 165 (left from the blanket coating process) is disposed about a perimeter of the second face 162b and engages the second side 143b of the membrane 140 adjacent the aperture 146. The second face 162b defines a planar surface surrounded by the perimeter, and the lip 165 defined about the perimeter preferably extends with a ridge 167 at a level/height beyond the planar surface of the second face 162b inside the perimeter. The overlaying lip 165 with its ridge 167 (being defined about the perimeter of the second face 163 and being raised above the face's planar surface) may help provide a concavity to the mirror's central portion. This concavity can counteract a tendency for bowing (B; FIG. 4F) in the mirror 160 in the aperture 146. In this way, the translatable mirror 160 can at least have a flat surface (face 162a and/or 162b) with respect to the face 123a of the fixed mirror 120 of the tunable optical filter (100).

In the tunable filter 100, the controlled deflection of the movable membrane 140 translates the mirror 160 to tune the Fabry-Perot resonator cavity 170. In such a device, the thin membrane 140 can become bowed (B) or curved and the mirror 160 can also become bowed (B) due to stresses. The bowing (B) alters the resonator cavity 170. For example, modes of the resonator cavity 170 can become stable.

As shown in FIG. 5, the top mirror 160 has a counter bow (CB) built into its shape that counteracts the tendency of the top mirror to bow (B) outward. Primarily and as disclosed below, each of the staked layers that make up the mirror 160 have at least one structural parameter. The at least one structural parameter of each of the layers is associated with at least one of stress, thickness, and constituent material of the layer. Therefore, in the mirror 160 disclosed herein, the at least one structural parameter for one or more of the layers is configured to reduce a curvature of the mirror 160 (i.e., to increase a radius of curvature of the mirror 160), and the reduced curvature when combined with an aperture is configured to increase a working distance between the mirror 160 and a fiber input. As a result, the top mirror 160 has a low curvature (or a large radius r of curvature) in the assembly. This creates a half-symmetric resonator cavity 170 that couples efficiently with Gaussian beams from a lensed fiber at a long working distance from the top mirror 160, as described later.

Figure 6:
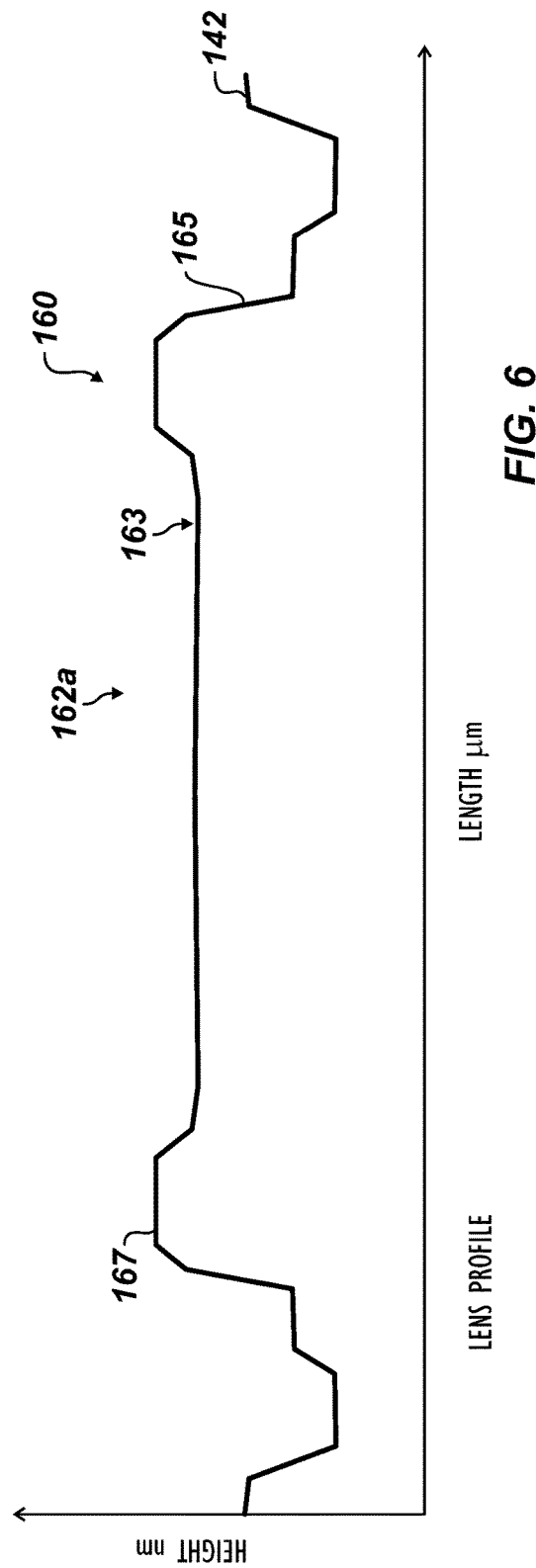
FIG. 6 graphs a profile of a translatable mirror showing length relative to height.

Particular details of the structure of the translatable mirror 160 are further detailed in profiles of FIG. 6, which graphs a profile of the translatable mirror 160 showing its length relative to its height. (The scale of the height is different relative to the length's scale so features are highlighted.) The profile represents the shape of the top face 162a of the mirror 160. As described previously, the perimeter 165 of the mirror 160 can include a ridge 167, which may engage the top side 142 of the membrane (140) adjacent the aperture (144). This may not necessarily be reflected in the profile here.

The mirror 160 transitions from the outer perimeter 165 to the ridge 167 that extends a height about 1000 nm beyond a central planar surface 163 of the mirror's face inside the perimeter 165. The ridge 167 provides concavity to the second side of the mirror 160 and tends to counteract a tendency of the central planar surface 163 to bow with a convexity. Again, other dimensions can be used for other configurations, and these dimensions are merely provided as an illustrative example.

As will be appreciated according to the teachings of the present disclosure, the opposing face or surface of the mirror 160 in FIGS. 1 and 5 exposed at the aperture 146 on the inside surface of the membrane 140 is substantially parallel to the central planar surface 163. In the end, the translatable mirror 160 is substantially flat and with the aperture 146 provides sufficient side mode suppression of the spectral signal S. This allows the tunable optical filter 100 to be used more readily in free space packaging (i.e., a flip chip arrangement).

Figure 7A:
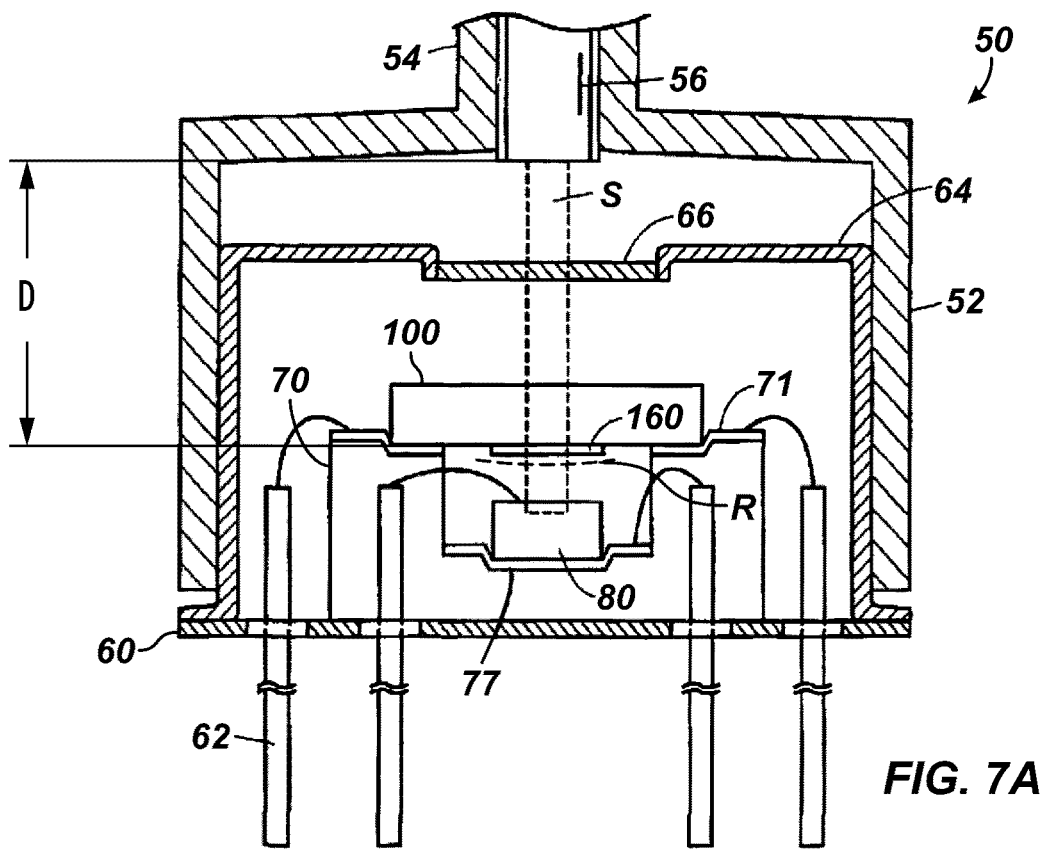
FIG. 7A illustrates a schematic side view of a package having an optoelectronic device of the present disclosure to filter an optical signal for a sensor.

In one configuration, for example, FIG. 7A illustrates a schematic side view of the disclosed tunable optical filter 100 together with one or more passive and/or active optical/optoelectronic components 80. The filter 100 and components 80 are arranged in a "stack up" format inside a package 50, which includes an optical access window 66 through which a free-space optical signal S can pass.

The package 50 includes a header 60 with a cap 64 mounted thereon and forming a sealed interior cavity. A standoff element 70 is affixed to the header 60, and electrical pins 62 come up through header 60 to make electrical connections to the tunable filter 100 and to other optoelectrical components 80 inside of package 50. The standoff element 70 holds the tunable filter 100 and optoelectronics 80 in a vertically arranged stack with the major plane of the filter 100 arranged substantially parallel to the upper mounting surface of header 60.

In operation, an optical signal S from an optical fiber 56 passes through the cap's window 66 and into the interior of package 50 where the optical signal S then passes through the tunable filter 100. A filtered signal exiting the other side of tunable filter 100 then impinges on the optoelectronics 80.

The standoff element 70 is made out of an electrically insulating material, such as a ceramic (e.g. alumina or aluminum nitride). This element 70 suspends the tunable filter 100 at a fixed, well-controlled distance above the optoelectronics 80, which can be a sensor, a PIN detector, SLED/LED emitter, etc.

Conductive traces (or contact pads) 71 and 77 may be defined on this stand-off element 70 for the purpose of contact and interconnect. As described, the disclosed filter 100 includes a substrate (110) with the tunable elements formed on one of its surfaces (e.g., downward facing surface). This is an example of flip-chip mounting according to which the disclosed filter 100 is flipped over and mounted onto the standoff element 70 to facilitate making electrical connections to the metal traces formed on the filter's side.

As will be appreciated, flip-chip mounting (i.e., flip chip in package (FCiP) technology) is preferred over conventional wire bonding. Using passive alignment guides or reference marks, the tunable filter 100 and the optoelectronic component 80 can be accurately aligned in the x-y plane (where typical requirements for free-space elements is on the order of 10 microns) and can be accurately placed along the z-axis. The assembly may be accomplished using standard chip-mounting equipment.

As further shown in FIG. 7A, a cover 52 with an integrally formed collar 54 can fit onto the cap 64 of the package 50. The cover 52 can hold the optical fiber 56 (which may include collimating or focusing optics at its end) within the collar 54 and can properly align the filter 56 with respect to window 66 within package 50. The collimating optics can take various forms including a GRIN (gradient index lens) or a ball lens. Similarly, the focusing optics can also take various forms.

In one configuration, the tunable optical filter 100 can be packaged with a small diameter photodetector 80. For example, the photodetector 80 can have a diameter of 300 μm or less, such as a diameter of 80 μm, to improve the side-mode suppression ratio (SMSR). To do this, an aperture (not shown) can be formed on the back of the filter's substrate (110) to provide side mode filtering and suppression. In any event, the arrangement would require only one high tolerance optical element alignment in the package 50.

The package 50 as shown can be a TO ("Transistor Outline") style package. The header 60 has multiple integral conducting pins ("feet") 62 extending through it and her-metically sealed within the pass-throughs using a solder glass. These conducting pins 62 provide a way to electrically connect with the internal optoelectronics and associated elements. When fully assembled, the pins are connected to corresponding metallic pads on the enclosed optoelectronics by wires. If desired, a temperature sensor (e.g. thermistor) can be mounted on the header 60 and can be used to monitor the temperature of the package 50 to aid in the operation of the device.

Figure 7B:
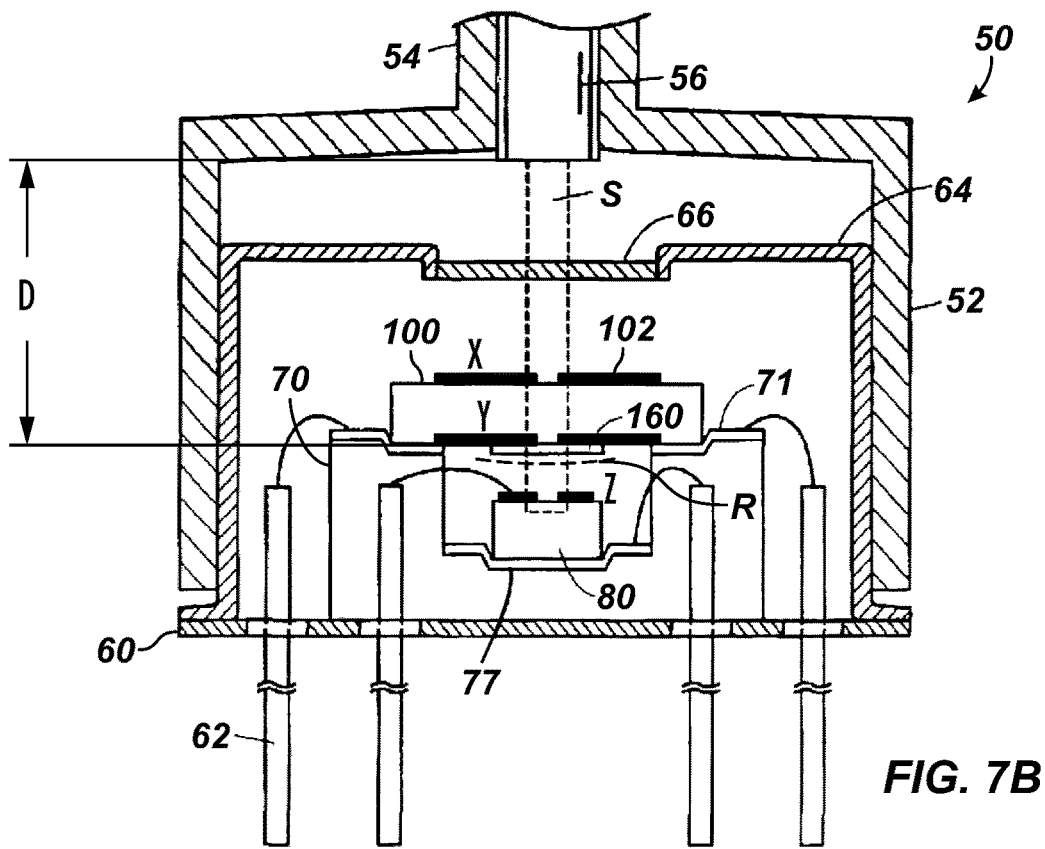
FIG. 7B illustrates a schematic side view of another package having an optoelectronic device of the present disclosure to filter an optical signal for a sensor.

In another arrangement of the package 50 as shown in FIG. 7B, the tunable optical filter 100 can be packaged with a small diameter aperture 102 disposed along the optical path. The size of the aperture 102 and its placement are selected to reject high-order optical modes of the tunable optical filter 100. For example, the aperture 102 can have a diameter of 30 μm or similar to improve the side-mode suppression ratio (SMSR) by careful placement within the package 50.

The aperture 102 can be either built-in to the chip or substrate or can be placed separately from the chip or substrate. As shown in configuration (X), an aperture 102 can be formed on the back of the filter's substrate to provide side-mode filtering and suppression. Here, the aperture 102 can be incorporated into the backside of the filter chip's substrate, being either etched onto the substrate during fabrication or placed and secured there during an optimization process before sealing the lid of the package.

Alternatively, an aperture 102 as shown in configuration (Y) can be formed under the bottom mirror 160 of the tunable optical filter 100. In another configuration (Z), an aperture 102 can be placed atop the photodiode chip 60 that is used to collect the optical signal. As with the configuration (X), the placement and securing of the aperture 102 in configuration (Z) can be performed as part of an optimization process that occurs before the package 50 is sealed. If practical, more than one of these configurations (X), (Y), (Z) can be used together.

The careful selection of tunable optical filter characteristics, aperture size for the aperture 102, and photodiode 80 dimensions is used to achieve significant performance improvement and to eliminate the need for complex packaging and alignment processes. For example, using such an aperture 102 in conjunction with a large area photodiode 80 can significantly improve the side mode filtering and suppression without adding complex alignment requirements during the assembly process or requiring the use of more complex and expensive packaging approaches.

Figure 7C:
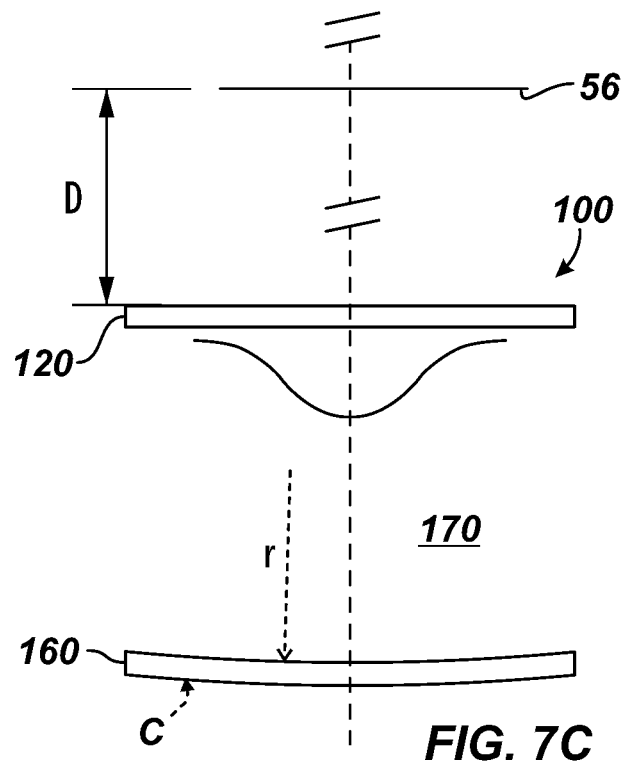
FIG. 7C schematically illustrates a half-symmetric resonator cavity of the present disclosure at a working distance from a lensed fiber.

As noted above with respect to FIGS. 5-6, the top mirror 160 has a low curvature C or bow B (i.e., a large radius r of curvature), which creates a half-symmetric resonator cavity 170 that couples efficiently with Gaussian beams from a lensed fiber with a long working distance. As shown in FIG. 7C, a lensed fiber 56 is situated at a working distance D that is well spaced from the tunable filter 100 with its mirrors 120, 160. The low curvature C (or a large radius r of curvature) of the top mirror 160 (shown inverted in the flip-chip arrangement) creates a half-symmetric resonator cavity 170 for the etalon that couples efficiently with the Gaussian beam (S) from the lensed fiber 56 at the long working distance D. In turn, the long working distance D facilitates incorporating the tunable filter 100 directly into less costly and more practical forms of TO-packaging, as shown in FIG. 7A.

All the same, even though the arrangement of the fiber 56, the filter 100, and the component 80 can have a long working distance D between the fiber 56 and the filter 100, the particulars for the working distance D on the input side are dictated by the properties or capability of the fiber 56 or collimator that delivers the input signal. Therefore, viewed differently, benefits of the low curvature mirror 160 are also on the output side of the filter 100 and how the low curvature leads to a significant reduction of the side modes (improved side mode suppression ratio), which then allows for use of a wide receiver area, such as of a photodiode, for the component 80 in the arrangement.

The higher radius r of curvature for the mirror 160 results in a filter 100 that has a much larger cavity mode diameter and thus allows for a much larger optical beam spot size to be used at the filter without exciting significant high order side modes. Such a large spot size is suited to the long working distance D. These aspects of the disclosed filter 100 have particular benefits over existing configurations that require a short working distance and a narrower receiver area.

Figure 7D:
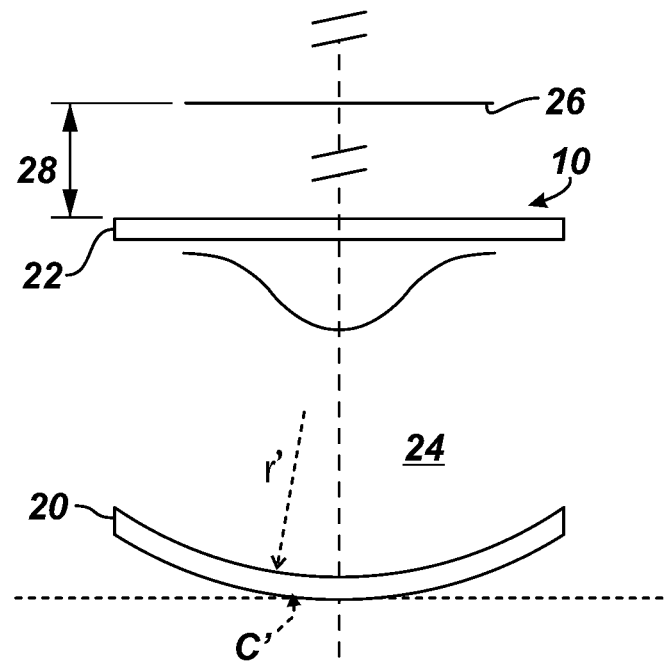
FIG. 7D schematically illustrates a half-symmetric resonator cavity of the prior art at a closer working distance from a lensed fiber.

The TO-packaging of the present disclosure is in contrast to packaging arrangements found in prior art, which require a tunable filter and a fiber to be placed in very close proximity to one another for operation. For example, FIG. 7D schematically illustrates a tunable filter 10 of the prior art. The tunable filter 10 has a typical arrangement in which a half-symmetric resonator cavity 24 between a flat mirror 22 and a curved mirror 20 having typical increased bowing or curvature C' (i.e., a short radius r' of curvature), requires a lensed fiber 26 to be placed at a close working distance 28 to achieve efficient beam coupling.

In general, the difference in working distance D and working distance 28 between the two arrangements in FIGS. 7C-7D can be significant. The working distance D for the mirror 160 having low curvature C (i.e., increased radius r of curvature) as disclosed herein can be about 3-mm or larger. Designs of the prior art having greater bow of the mirror 20 as in FIG. 7D may require much closer working distances 28 about 20-30 μm, which complicates the assembly, or requires the use of much smaller apertures to filter out high-order modes, increasing the insertion loss.

In the end, the mirror 160 being relatively flat (with a large radius of curvature) allows for simpler packaging of the filter 100 with a long working distance D and much better optical properties. For instance, compared to a conventional tunable filter packaged in a device, the disclosed filter 100 can have much lower insertion losses and much less challenging alignment issues due to the suppression of the side modes by the filter 100. Due to Gaussian beam optics, the working distance in a conventional tunable filter packaged in a device needs to be shorter to produce a small spot size. The performance is degraded because the conventional tunable filter experiences higher insertion losses or poor side-mode suppression (due to the need to filter out much of the signal using a very small aperture). The use of a very small aperture would also complicate the alignment process. With the filter 100 disclosed herein, however, a smaller spot size is possible despite the packaging requirements, such as those imposed by the use of a TO-46 can.

In general, the "bow" of the mirror 160 according to the present disclosure may be at least an order of magnitude less than 1 micron. Put another way, the radius of curvature of the mirror 160 can be at least 10-mm. For example, the disclosed mirror 160 may have a "bow" of about 10-nanometer, whereas the prior art mirror 20 may have a "bow" of about 1-micron. In fact, the disclosed mirror 160 may have about 60 times less curvature than the mirror 20 of the prior art. Some amount of a radius of curvature for the disclosed mirror 160 helps maintain a stable cavity (170) and can prevent inversion of the mirror toward the bottom mirror.

Yet, the disclosed mirror 160 with its low curvature (i.e., increased radius of curvature) allows for the larger working distance D, reduces side modes, and allows for a wide area receiver component 80, which has major benefits in an optical device as disclosed herein.

For example, the required close proximity 28 between the prior art filter 10 and the fiber 26 complicates the packaging that can be used in the prior art and can be more costly or require performance trade-offs such as increased insertion loss and less-effective side-mode suppression. The fiber 26 must feed through the wall of the packaging, which must still remain hermetically sealed in order to meet reliability requirements. For this reason, the required close proximity 28 between the filter and the fiber 26 necessitates using a butterfly package for the assembly in the prior art. Such is not the case here with the TO-packaging having the tunable filter according to the present disclosure, such as depicted in FIG. 7A.

Instead of including an optoelectronic component, such as a sensor or a photodetector, for use with the disclosed tunable optical filter 100, the package 50 can include a multi-port arrangement having axially aligned input and output ports at the top and bottom, respectively. The two-port, TO package 50 can include an integrated feed-through which allows an optical signal to pass through the disclosed filter (100) and any other components housed inside of the package 50.

To do this, the header 60 can include a through-hole formed at its center with a sealed window. Another ferrule (not shown) can extend down away from the bottom of header 60 and can be aligned with the header's through-hole. A second ferrule (not shown) can then hold another optical fiber enclosed in a sleeve, and a ball lens can be affixed to the this optical fiber adjacent to the header's window.

Such an arrangement defines an optical path through the center of the package 50 along its longitudinal axis. Any one of a number of different combinations of optoelectronic devices, including the tunable filter 100, can be mounted on the header 60 inside the package 50 and in the optical path between the opposing optic fibers.

Having an understanding of the tunable optical filter 100 and its packaging for use in an optoelectronic application, discussion turns to some details of its operation.

FIGS. 8A through 8D graph details of the operation of tunable filters (100) manufactured according to the teachings of the present disclosure. The chips having the tunable optical filters (100) are capable of C+L bands of operation and are mounted into TO packages, as disclosed herein. An alignment station is then used to characterize the performance of the C+L capable tunable filters (100). In the characterization, the tunable filters (100) are voltage tuned over the full C+L band. Tuning greater than 10 THz is achieved within 34 V. The passband ranges from 7-10 GHz, and the insertion loss (IL) ranges from 2-5 dB.

Figure 8A:
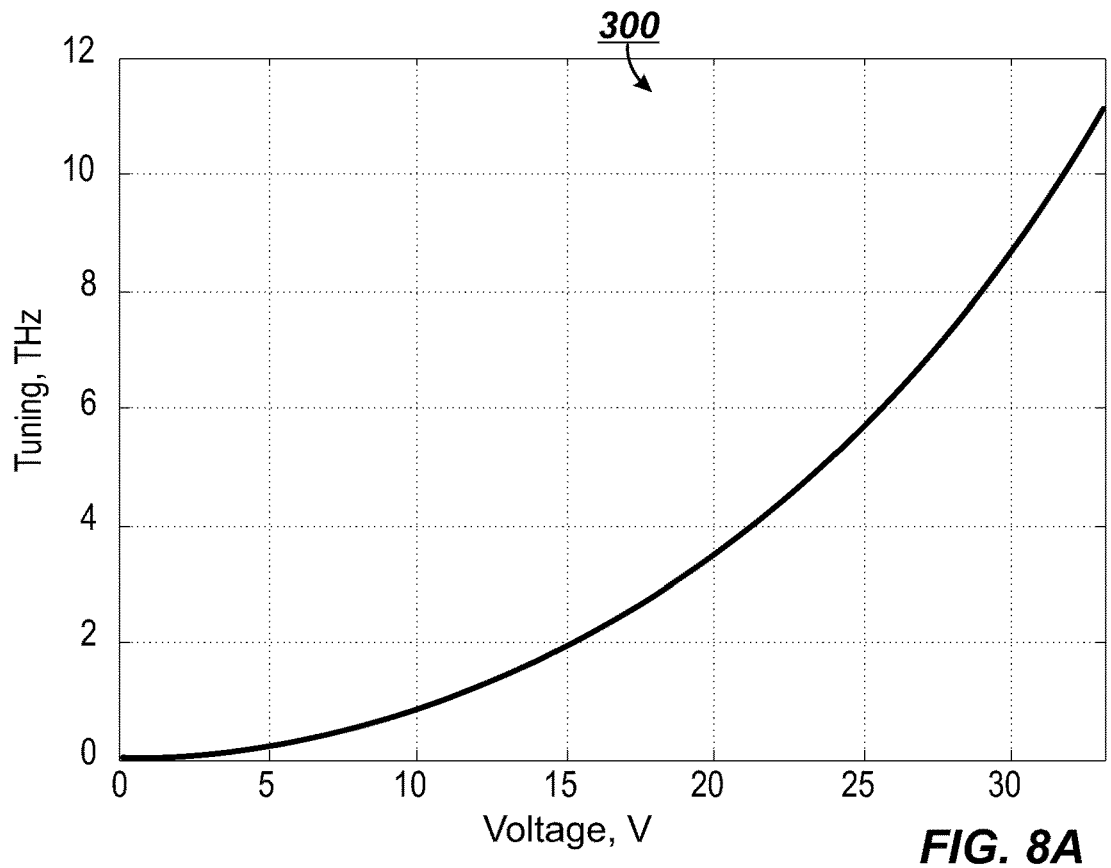
FIG. 8A graphs a relationship between voltage versus tuning frequency for tunable optical filters of the present disclosure.

FIG. 8A graphs a relationship 300 between voltage (V) versus tuning frequency (THz) for various tunable optical filters (100) of the present disclosure. The optical filters (100) under investigation can include various chip arrangements according to the present disclosure that may differ from one another by configured parameters. As can be seen, the voltage applied between 0 to 35-volts produces an exponentially increasing tuning frequency from 0 to almost 12 THz.

Figure 8B:
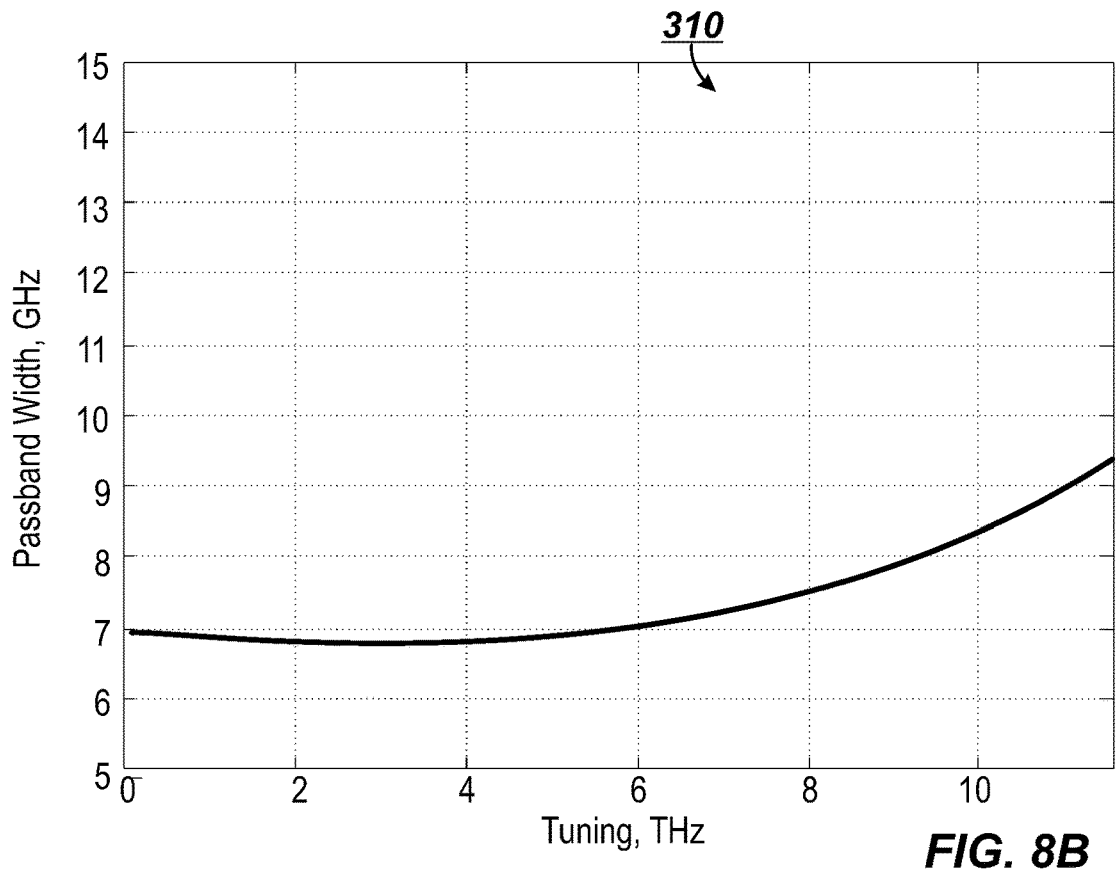
FIG. 8B graphs a relationship between tuning frequency versus passband for tunable optical filters of the present disclosure.

FIG. 8B graphs a relationship 310 between the tuning frequency (THz) versus passband (GHz) for the different optical filters (100). As can be seen, the passband shows a building trend from about 7-GHz about 9.5-GHz for tuning frequencies of 0 to 12-THz.

Figure 8C:
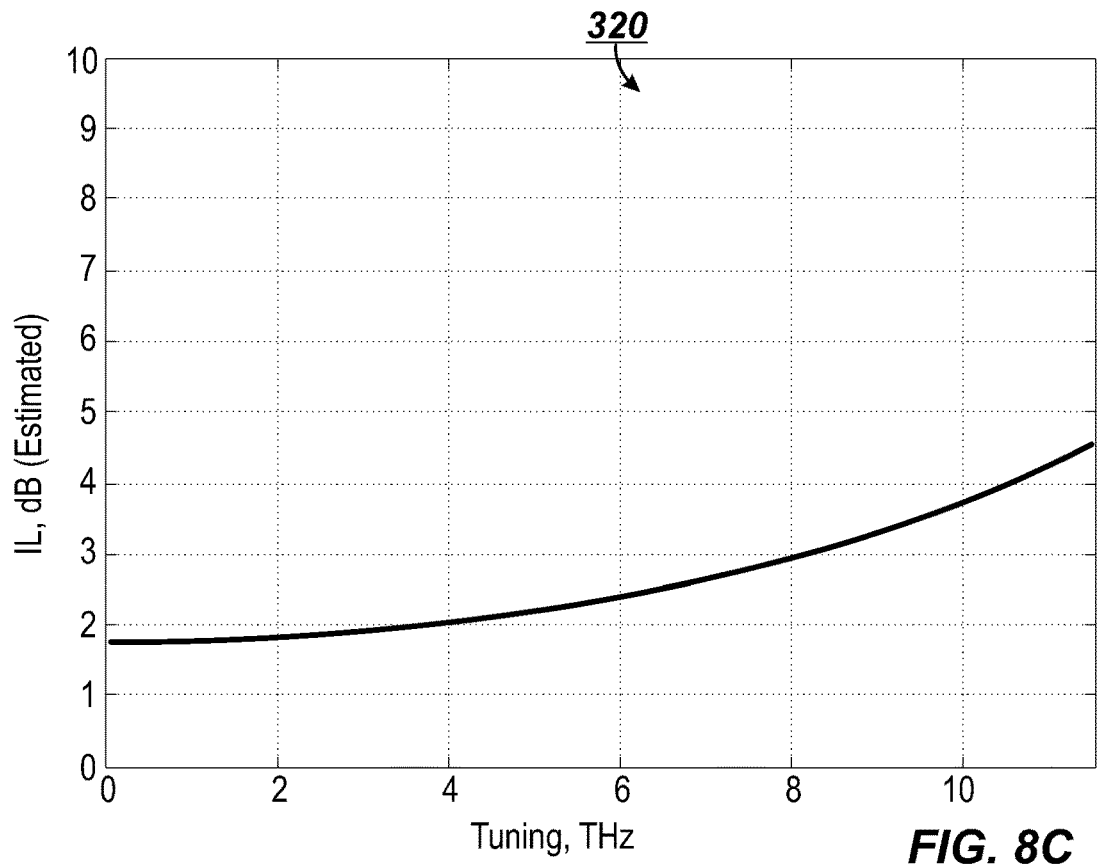
FIG. 8C graphs a relationship between tuning frequency versus IL (dB) for tunable optical filters of the present disclosure.

FIG. 8C graphs a relationship 320 between the tuning frequency (THz) versus insertion loss (IL) in dB for the different optical filters (100). As can be seen, the insertion loss (IL) shows a building trend from a range (about a litter over 1 dB to about a little over 2 dB) at a tuning frequency of 0-THz to a range (about 3.5 dB to about a little over 5 dB) at a tuning frequency of 12-THz.

Figure 8D:
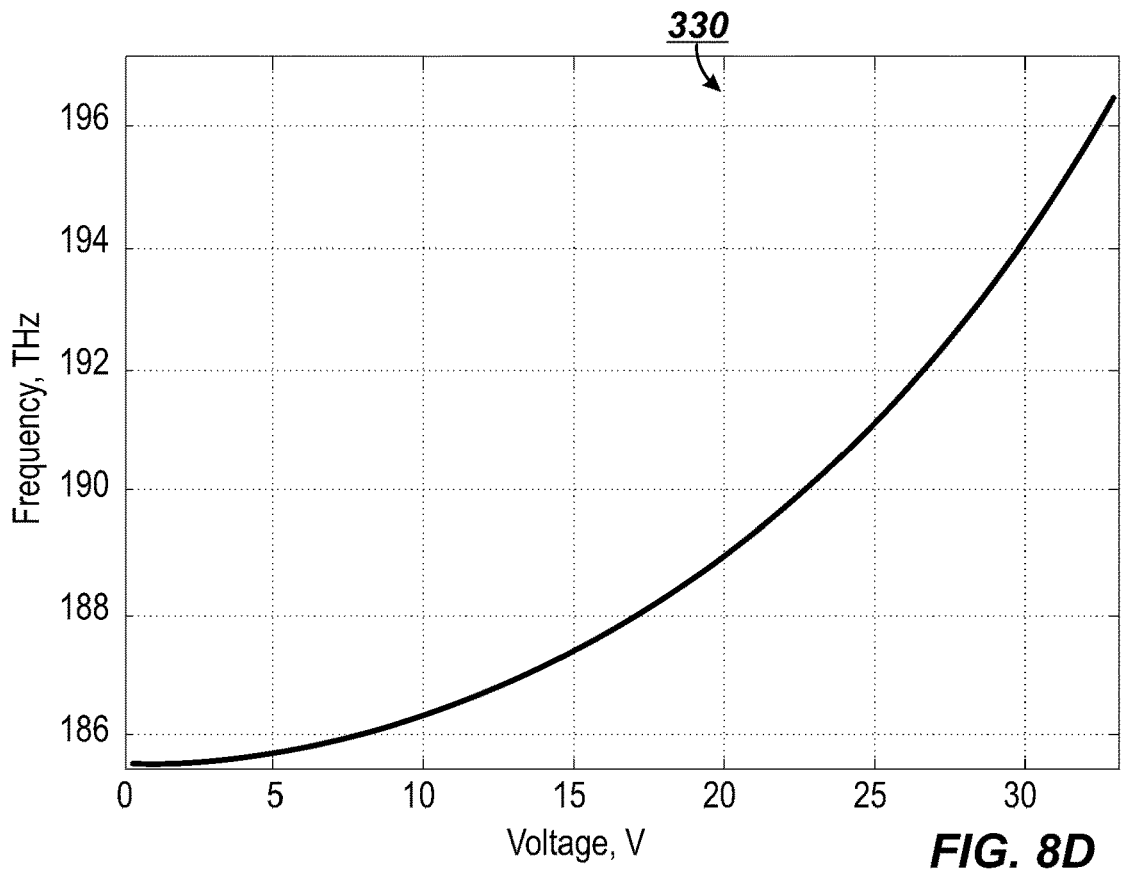
FIG. 8D graphs a relationship between voltage versus frequency for tunable optical filters of the present disclosure.

FIG. 8D graphs a relationship 330 between voltage (V) versus spectral frequency (THz) for the different optical filters (100). As can be seen, a voltage V applied between 0 to 35-volts produces an exponentially increasing spectral frequency from a little less from 186-THz to almost 197-THz. This shows that the tunable optical filter of the present disclosure can provide a 10 THz scan range within a 32.5-volt maximum of applied voltage.

Figure 9A:
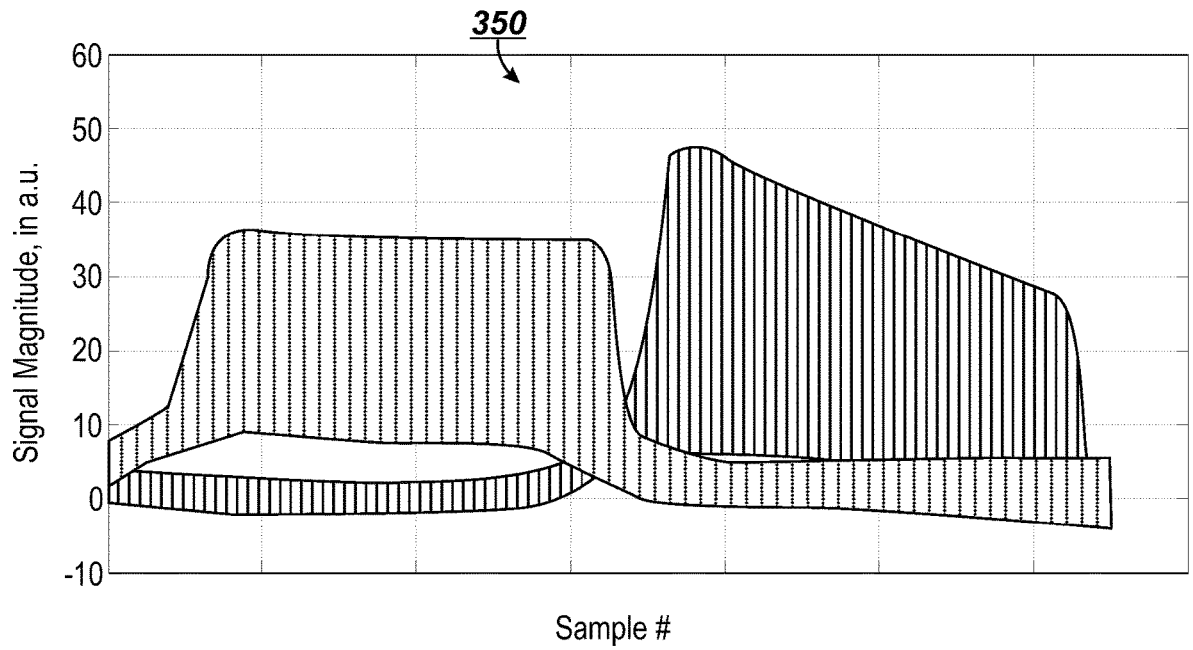
FIG. 9A graphs samples versus analog digital converter counts for the tunable optical filter used with a photodiode in two frequency bands.
Figure 9B:
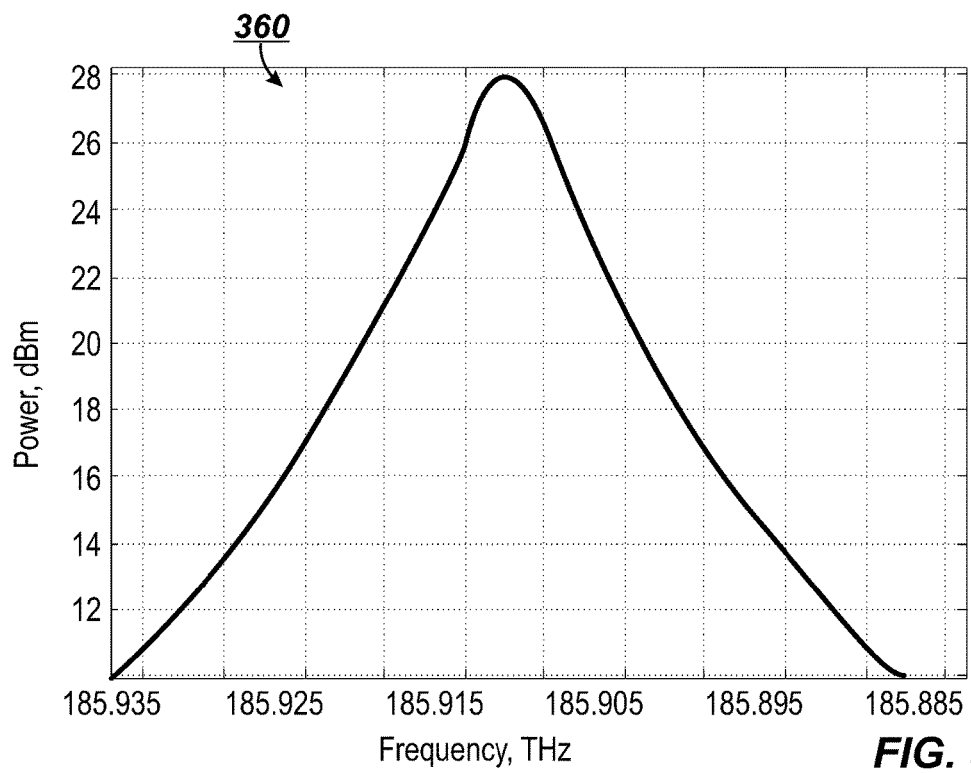
FIG. 9B graphs a relationship between frequency versus power for the tunable optical filter used with a photodiode in a first frequency band.

FIGS. 9A and 9B graph operation of a tunable optical detector manufactured according to the teachings of the present disclosure. In manufacturing the tunable detectors, chips capable of C+L bands of operation are selected, probed, and mounted into TO packages along with a photodetector, as disclosed herein.

In the characterization, the tunable filters are voltage tuned over the full C+L band. Graph 350 in FIG. 9A shows a number of samples versus signal magnitude for the disclosed tunable filter used with the photodiode in two spectral frequency bands. The C-band range of about 1530-1565 (nm) is shown as measured relative to the L-band range of 1565-1625 (nm). C-band and L-band 50 GHz combined source measurements are shown as measured separately on the same device simply due to the test setup used to characterize the operation.

FIG. 9B graphs a relationship 360 between frequency (THz) versus optical power (dBm) detected with the disclosed tunable filter and photodiode in a first frequency band centered about 185.9-THz. A similar relationship between frequency (THz) versus optical power (dBm) detected with the disclosed tunable filter and photodiode in a second frequency band centered about another frequency may be similar.

As the graphs in FIGS. 9A-9B reveal, the tunable optical detector manufactured according to the teachings of the present disclosure can measure well-defined and similar optical powers at a frequency difference of about 10 THz.

As disclosed herein, the tunable optical filter of the present disclosure offers a large tuning range and can cover both C and L-bands in one optoelectrical device. The operation of the tunable optical filter allows for fast scanning and scanning in both frequency directions. As such, the tunable optical filter can be suitable for both telecommunication and non-telecommunication applications.

As noted previously, the structural features of the layers that make up the second mirror 160 give the second mirror 160 a low curvature (i.e., increased radius of curvature), which has a number of benefits for an optical device as disclosed herein. For instance and as noted above, the tunable filter 100 has the half-symmetric resonator cavity 170 formed by the substantially planar mirror 120 and the slightly curved mirror 160 having the low curvature (i.e., the large radius for its curvature). Each of the staked layers that make up the mirror 160 have at least one structural parameter. The at least one structural parameter of each of the layers is associated with at least one of stress, thickness, and constituent material of the layer. Therefore, in the mirror 160 disclosed herein, the at least one structural parameter for one or more of the layers is configured to reduce a curvature of the mirror 160 (i.e., to give the mirror 160 a large radius for its curvature so that it is flatter), and the reduced curvature is configured to increase a working distance between the mirror 160 and a fiber input while achieving the desired performance including low insertion loss and high side-mode suppression. Details related to the structural parameters are now discussed with reference to FIGS. 10A-10B.

Figure 10A:
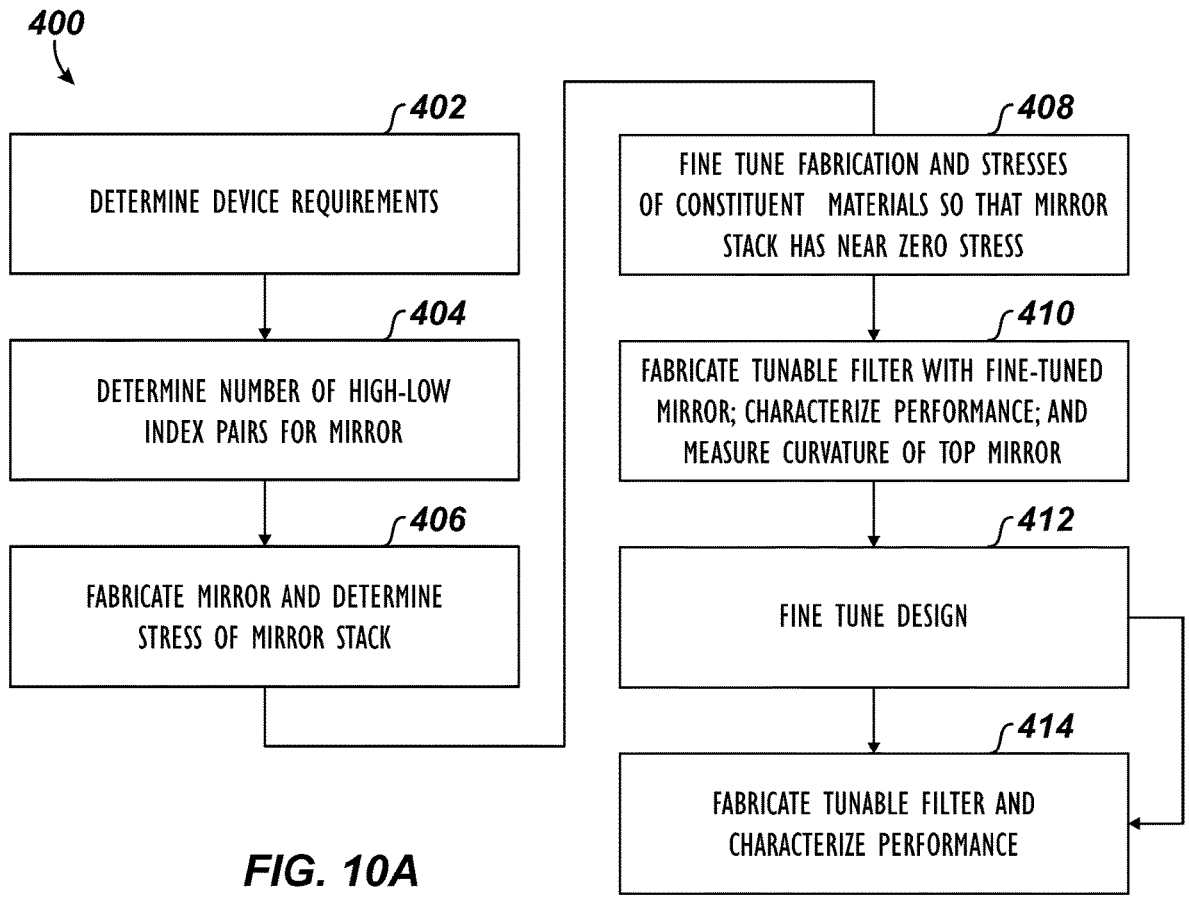
FIG. 10A illustrates a flow chart of a process to fabricate a tunable filter having a top mirror with a low or reduced "curvature" of the present disclosure.
Figure 10B:
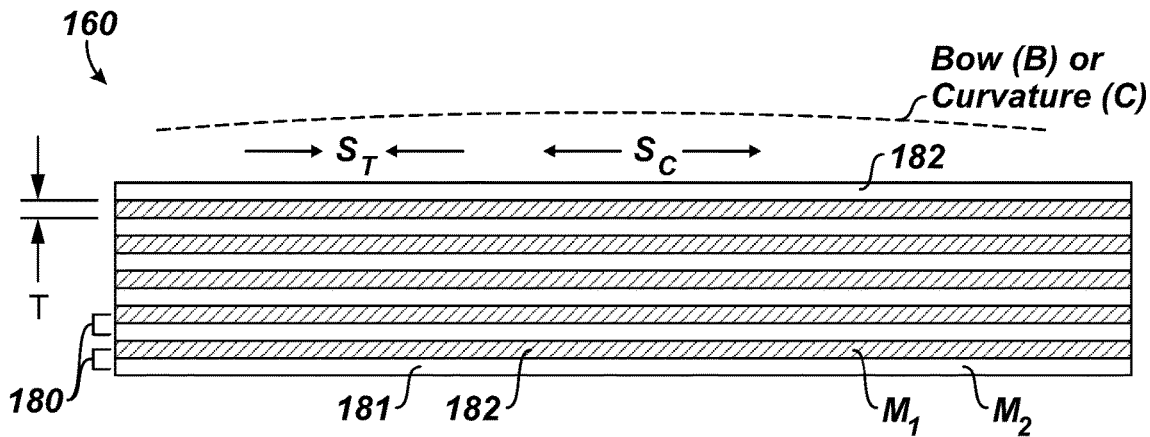
FIG. 10B schematically illustrates features of the fabricated top mirror.

FIG. 10A illustrates a flow chart of a process 400 to design and fabricate a tunable filter having a top mirror (160) according to the present disclosure. Reference to elements of the fabricated mirror 160 schematically shown in FIG. 10B are made for explanation. The fabrication produces a top mirror 160 with a low curvature to produce a tunable filter with a larger working distance as noted herein.

The device requirements for a tunable filter (100) are first determined and defined so that the filter (100) can be fabricated with the desired low curvature top mirror 160 (Block 402). These requirements depend on the implementation at hand, in which applications the tunable filter (100) will be used, what types of filtering the filter (100) must perform, etc. In general, the requirements include optical performance requirements related to the DBR mirror 160, bandwidth (e.g., full width at half maximum (FWHM)), insertion loss (IL), etc. Moreover, a required radius r of curvature for the top mirror 160 is selected for the desired cavity mode diameter of the tunable filter (100) to be fabricated.

Design of the top DBR mirror 160 is then undertaken so as to meet the defined requirements (Block 404). The design of the top DBR mirror 160 involves determining structural parameters for the mirror 160. For example, a determination is made as to what constituent materials M1, M2 to use in constructing the alternating layers 181, 182 of the mirror 160, and a determination is made as to a number of high-low index pairs 180 of the layers 181, 182 to use for the construction of the mirror 160. The design at this stage is based on the indices of the constituent materials M1, M2 to be used, the thickness T of the layers 181, 182 of the mirror 160 (e.g., thickness of ¼ wavelength for the implementation), and other factors that are expected to achieve the desired optical performance. Design at this stage use simulations, calculations, and theory to select the characteristics of the mirror 160 to achieve the optical requirements and produce a low curvature R.

A host of constituent materials are available in the industry and can be selected to construct the mirror 160. Overall, the constituent materials M1, M2 are selected with suitable high and low refractive indices, the stresses they produce, and other parameters. (Stress is referenced in a general sense herein and may include forms of intrinsic stress associated with deposited material in a layer 181, 182 for the mirror 160 as well as forms of external stress, such as due to thermal expansion or other external sources. Moreover, the stress as referenced herein gives an indication for the curvature of the mirror 160, but the resulting bow of the mirror 160 in the fabricated tunable filter (100) may likely differ). The number of layers 181, 182 is selected for the performance requirements: the more layers 181, 182 will increase the spectral sharpness, but will also increase insertion losses. The design in FIG. 11B has 11 layers with 5 pairs 180, but this is only meant as an example. Each of the constituent layers 181, 182 has a stress characteristic. Preferably, the alternating layers 181, 182 are selected to reduce the overall stress of the mirror stack 160. This can involve selecting one layer 181 characterized by tensile stress $S_T$ and selecting the other layer 182 characterized by compressive stress $S_C$.

The top mirror 160 is then fabricated as designed above (Block 406). As will be appreciated, the staked layers 181, 182 making up the top mirror 160 have stresses $S_T$, $S_C$ tending to curve the top mirror 160. The stress of the mirror stack 160 is then determined by analyzing the fabrication. For example, measurements relative to the curvature can be made before and after deposition of the layers 181, 182.

This analysis gives an indication of how the structural parameters associated with the constituent materials M1, M2, the stresses of the layers 181, 182, the thicknesses of the layers 181, 182; the number of high-low index pairs 180 of the design, and the like can produce a top mirror 160 with a low curvature C (i.e., increased radius r of curvature) as desired for the tunable filter (100). As noted above, the stresses associated with the constituent materials M1, M2 has a primary influence on how the mirror 160 bows with a radius of curvature. These stresses are governed by the materials used, the deposition conditions used for depositing the layers 181, 182 (e.g., the deposition process used, the rate of the deposition, etc.), and the thickness T of the layers 181, 182.

Based on the above analysis, the mirror material fabrication processes can be refined and optimized to fine tune the structural parameters, such as the stresses of the constituent materials M1, M2, of the mirror 160 (Block 408). The desire is to produce a mirror stack 160 that has near zero stress. The optimization may involve changing the constituent materials M1, M2 used in the mirror 160, changing the relative thicknesses T of one or more layers 181, 182 relative to others, modifying the deposition conditions in depositing the layers 181, 182 to alter the mechanical properties of the layers 181, 182, etc. Notably, to maintain the original optical performance, the indices of the constituent materials M1, M2 preferably remain close to the ones used in the initial mirror design. The refinement of the constituent materials M1, M2 and their characteristics may tend to relax or deviate from the initial materials M1, M2 and characteristics with the purpose of reducing the stresses but staying close to the operational parameters for the implementation at hand. Rather than changing the constituent materials M1, M2, the layer deposition process can more preferably be modified to change the mechanical properties of the constituent materials M1, M2 in the layers 181, 182 of the mirror 160.

Once the design has been fine-tuned, trials for the fabrication and design can be performed on an actual tunable filter (100) (Block 410). The tunable filter (100) is fabricated to have the fine-tuned features of the top mirror 160. Performance of the tunable filter (100) is then characterized, and the radius r of curvature of the top mirror 160 is calculated or measured. This trial review of the tunable filter (100) will indicate whether the mirror 160 achieves the low curvature C as designed and whether the filter (100) meets the operational requirements as planned.

Based on the trial review, the design of the top mirror 160 can be further fine-tuned to adjust the structural parameters of the layers 181, 182 (Block 412). The thicknesses T of one or more constituent material layers 181, 182 in the mirror 160 can be adjusted. For example, the thickness T of a tensile material of the layers can be changed, or the thickness T of a compressive material thickness may be changed. As will be appreciated, the change in thickness T would only be a very small percentage change for that design thickness suited to the performance requirements. Larger changes can be achieved by adjusting the conditions in the deposition process for the layers 181, 182 to alter the mechanical properties. The stress of the fabricated mirror 160 may be the overriding influence on the bow, but other structural effects may have influence. For instance, physical dimensions, such as the size associated with the membrane's aperture (146) and the like, can influence the resulting bow of the mirror 160, and these physical details can be adjusted. These and other refinements can be performed so as to increase or decrease the radius r of curvature of the mirror 160 as desired without appreciably compromising the optical performance of the filter (100).

The steps of fabricating the tunable filter (100), characterizing its performance, and further adjusting the characteristics of the top mirror 160 can be repeated (Blocks 412, 414) until the desired curvature C and performance is achieved.

As will be appreciated from the above discussion, a number of changes to the structural parameters of the mirror's layers 181, 182 may be made in refining the design and fabrication of the mirror 160 so that it is configured to have a low curvature C and produce a larger working distance as disclosed. In one example, the structural parameter that is adjusted can be associated with the stress such that the alternating layers have opposing compressive and tensile stresses between them to counteract one another. Alternatively, a first thickness of one of the alternating layers 181, 182 can be different (by a small percentage) from a second thickness of another of the alternating layers 181, 182. Further in combination, a first thickness of one of the alternating layers 181, 182 having compressive stress can be different (by a small percentage) from a second thickness of another of the alternating layers 181, 182 having tensile stress.

In another example, the structural parameter that is adjusted can be associated with the constituent material. A first mechanical property produced by a first deposition condition of a first of the constituent material (M1, M2) for a first of the alternating layers 181, 182 can be different from a second mechanical property produced by a second deposition condition of a second of the constituent materials (M1, M2) for a second of the alternating layers 181, 182. In that sense, one or more of the layers (e.g., 181, 182) of the same or different materials (M1, M2) may be adjusted relative to other layers (181, 182) of the same or different materials (M1, M2); multiple layers (e.g., 181) of the same constituent materials (e.g., M1) can be adjusted different from comparable layers (181) of the same constituent (M1); and any other combinations can be done. Altogether then, the stress, the thickness, and/or the constituent material of a given one or more layers 181, 182 can be adjusted to configure the low curvature C of the resulting mirror 160 as disclosed herein.

Figure 11A:
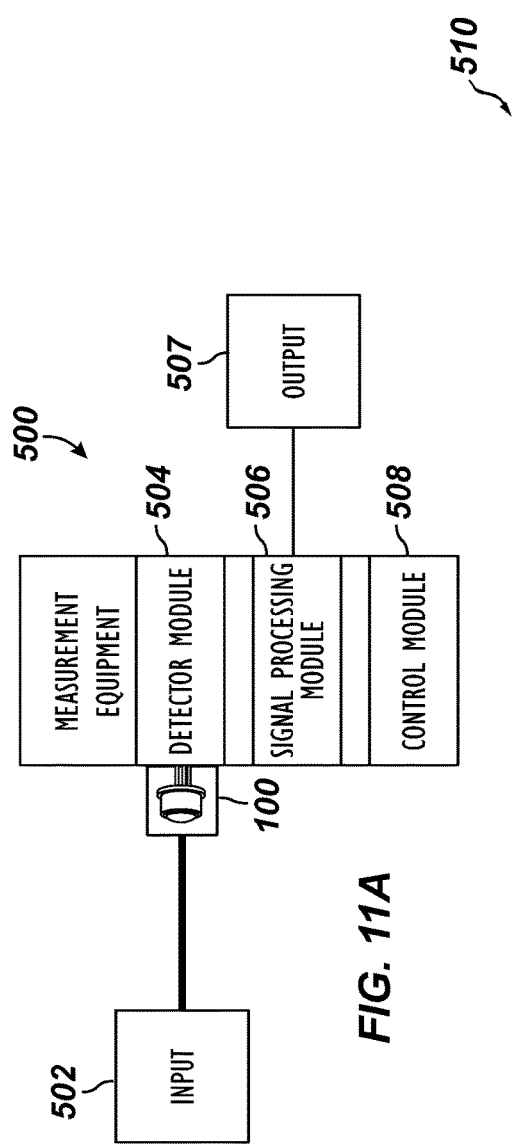
FIG. 11A illustrates an optoelectronic device of the present disclosure incorporated into an apparatus for measuring optical spectrum.
Figure 11B:
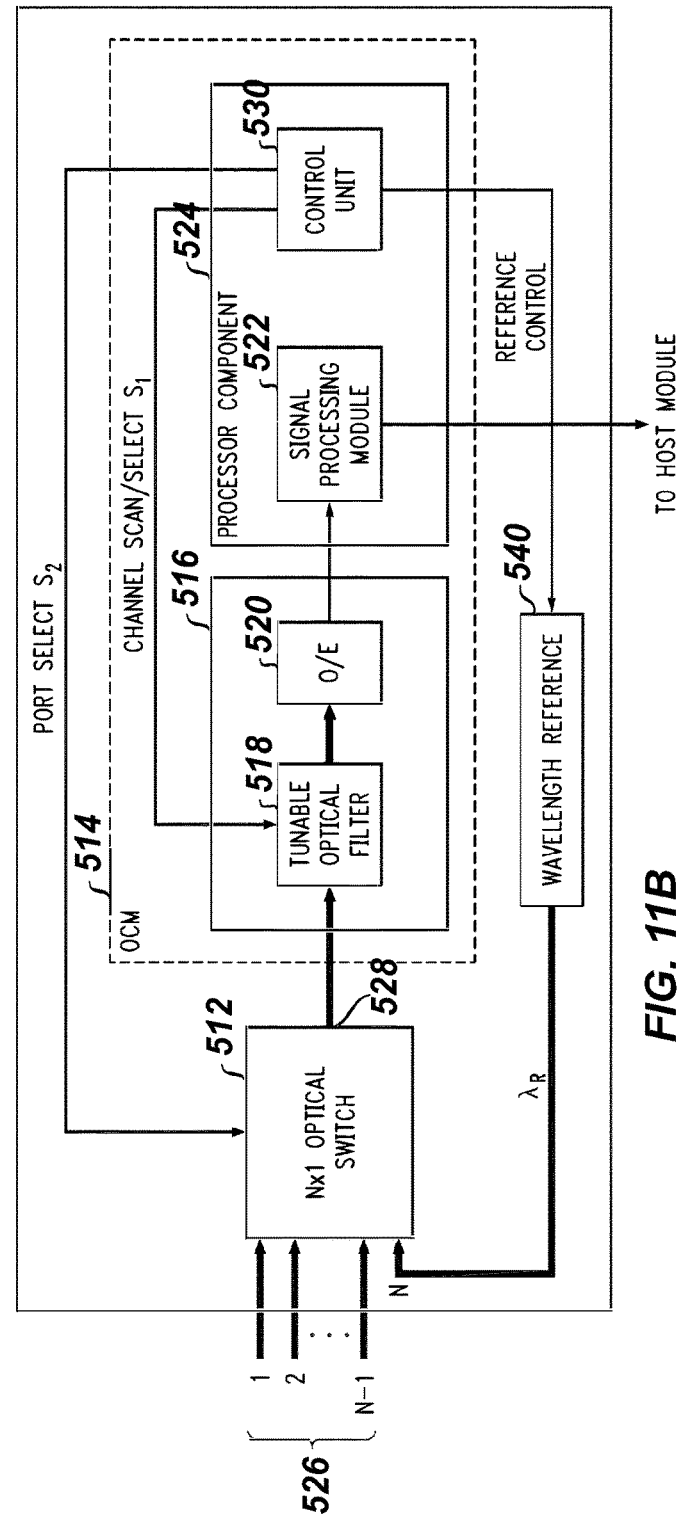
FIG. 11B illustrates an optoelectronic device of the present disclosure incorporated into an optical channel monitor.

FIG. 11A illustrates a tunable optical filter 100 of the present disclosure incorporated into an apparatus 500 that processes an input optical signal for analysis or other purposes. Examples of such an apparatus 500 can include a spectrometer, an optical spectrum analyzer (OSA), an optical channel monitor (OCM), or other optical spectrum measurement equipment needing measurement of frequency errors. For example, dense wavelength division multiplexing is used in telecommunications to provide a broad bandwidth in backbone optical networks. A narrow spacing is used between wavelength bands to increase the number of wavelengths used in the optical networks. This enables data rates of many Terabits per second (Tbps) to be communicated in a fiber.

As schematically shown, the apparatus 500 includes an input 502, a detector module 504, a signal processing module 506, and a control module 508. The input 502 of the apparatus 500 receives an input optical signal to be analyzed and can take the form of any conventional components for the particular optical spectrum measurement equipment. During measurements, this input optical signal is the measurement signal to be detected and analyzed according to the purpose of the apparatus 500.

The detector module 504 of the apparatus 500 is disposed in optical communication with the input 502 and is configured to detect the input optical signal. To do this, the detector module 504 includes a tunable optical filter 100 of the present disclosure. This filter 100 can use any other necessary optoelectronic components, such as sensors, photodetectors, collimating lens, filters, etc., in the detection module 504 to achieve the purposes of the apparatus 500.

Disposed in signal communication with the detector module 504, the signal processing module 506 is configured to process the detected optical signal for one or more spectral characteristics so the input optical signal can be analyzed according to the purpose of the apparatus 500. The signal processing module 506 then provides an appropriate output 507 of the processing, which can be used by other components of the apparatus 500 or by another piece of equipment.

For its part, the control module 508 is in signal communication with at least the signal processing module 506 and the detection module 503. The control module 508 is configured to control the tuning of the tunable optical filter 100 so that tuned filtering can be correlated with the detected characteristics of the signal analyzed by the signal processing module 506.

The tunable optical filter 100 is preferably a modular component having its integrate package of elements, which may include a photodetector as disclosed herein. This modular component allows the tunable optical filter 100 to be assembled, tested, and calibrated on its own independent of the apparatus 500. The modular tunable optical filter 100 100 can then be readily integrated into the other components of the apparatus 500. In this way, the package of the tunable optical filter 100 and any other elements of the detector module 504 can be integrated directly into circuitry and optical path of the apparatus 500.

As will be appreciated, elements of the modules and apparatus 500 can be comprised of hardware, software, and combinations thereof. The hardware can use any customary circuitry, processing units, memory, optical elements, optoelectronic devices, etc., as one skilled in the art will appreciate.

As noted above, the apparatus 500 can be an optical channel monitor, and the disclosed tunable optical filter 100 can be incorporated into the optical channel monitor. An example of this is given in FIG. 11B, which shows an optical channel monitor (OCM) 510 having a monitor assembly 514 having a detection component 516 and a processor component 524. The detection component 516 includes a tunable optical filter 518 and a photodetector 520. Both of these components 518, 520 can be packaged together in a package as disclosed herein. Alternatively, the tunable optical filter 518 can be packaged in a package as disclosed herein having a pass through for passing the spectral signal to the photodetector in another package.

The optical channel monitor 510 can be similar to that disclosed in U.S. Pat. No. 9,628,174, which is incorporated herein by reference. As shown, the optical channel monitor 510 incorporates a multiport optical switch 512 at the input of the monitor assembly 514, enabling efficient performance of the optical channel monitor 510 in more complex optical networks, such as those supporting DWDM and using multiple optical signal paths. The monitor assembly 514 includes the detection module 516 that functions to receive an incoming optical signal and provide an electrical output signal representative of the optical signal.

The incoming optical signal is considered to be supporting the propagation of multiple optical channels, each operating at a different wavelength. The tunable optical filter 518 receives the incoming optical signal and is tuned as disclosed herein to scan across a predetermined wavelength range of interest for the set of channels associated with that input signal. Alternatively, the tunable optical filter 518 can be adjustably centered on specific wavelength(s) associated with a presented optical signal "dwelling" on a particular wavelength if there are notable problems/errors associated with that channel.

Regardless, the optical output signal from tunable filter 518 is applied as an input to the photodiode 520 (or another suitable type of photodetection device) to transform the optical signal into an equivalent electrical representation. The electrical signal takes the form of a raw data spectrum, which is then applied as an electrical signal input to a signal processing module 522 within a processor component 524 of the monitor assembly 514.

In accordance with the conventional operation of the optical channel monitor 510, the signal processing module 522 analyzes this raw data spectrum and ascertains selected characteristics of the associated optical signal (e.g., power, level, wavelength OSNR, etc. of each separate channel contained within the incoming optical signal). The monitor assembly 514 then provides this information as an output information signal to a host module, typically a network management system (NMS), for use in controlling/correcting the characteristics of each individual channel. The multiport optical switch 512 at the input of the monitor assembly 14 is also controlled by the processor component 24 in a manner that allows for an improved efficiency in the monitoring process.

To check the accuracy of the measurement operations performed by the optical channel monitor 510, the wavelength reference 540 can provide the monitor assembly 514 with an input wavelength reference that can then be used by the monitor assembly 514 to self-recalibrate over time, compensating for changes in the operating conditions and/or aging of the optical and electrical components forming the detection module 516 of the monitor assembly 514.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An optoelectronic device, comprising:
a collar for holding an optical fiber outputting an optical signal;
a planar mirror disposed in an optical path of the optical signal;
electrodes;
a membrane that is movable relative to the planar mirror in accordance to a voltage applied to the electrodes;
a curved mirror, disposed on the membrane and translatable relative to the planar mirror with movement of the membrane, having a finite radius of curvature of at least 10 millimeters, the curved mirror comprising alternating layers of a compressive material characterized by a compressive stress and a tensile material characterized by a tensile stress that counteracts the compressive stress.

2. The device of claim 1, wherein the curvature of the curved mirror is configured to suppress a side mode of the optical signal.

3. The device of claim 1, wherein the planar mirror and the curved mirror define a resonant cavity of a Fabry-Perot etalon configured to filter the optical signal along the optical path.

4. The device of claim 3, wherein the Fabry-Perot etalon is configured to pass one or more spectral frequencies of the optical signal in accordance with a resonant frequency of the Fabry-Perot etalon.

5. The device of claim 4, wherein:
the planar mirror and the curved mirror are separated by a gap;
the resonant frequency of the Fabry-Perot etalon is dependent upon a length of the gap; and
the movement of the membrane changes the length of the gap separating the planar mirror and the curved mirror.

6. The device of claim 4, further comprising:
a sensor, disposed in the optical path, configured to detect the one or more spectral frequencies passed by the Fabry-Perot etalon.

7. The device of claim 6, wherein the sensor comprises a wide receiver area being suited to the suppressed side mode of the optical signal.

8. The device of claim 1, wherein:
the membrane comprises a first side facing the planar mirror, a second side opposite the first side, and a central portion that is movable relative to the planar mirror and includes an aperture in which the curved mirror is disposed; and
the curved mirror comprises a first face facing the planar mirror, a second face opposing the first face, and a lip that is disposed about a perimeter of the second face and engaged against the second side of the membrane adjacent the aperture.

9. The device of claim 1, wherein the alternating layers of the curved mirror comprise:

first alternating layers having a first thickness; and
second alternating layers having a second thickness that is different than the first thickness.

10. The device of claim 9, wherein the first thickness and the second thickness are configured to reduce the curvature of the curved mirror.

11. The device of claim 1, wherein the alternating layers of the curved mirror comprise:
first alternating layers having a first mechanical property produced by a first deposition condition; and
second alternating layers having a second mechanical property produced by a second deposition condition.

12. The device of claim 11, wherein the first mechanical property and the second mechanical property are configured to reduce the curvature of the curved mirror.

13. The device of claim 1, wherein a working distance between the planar mirror and the optical fiber is greater than or equal to 3 millimeters.

14. The device of claim 1, further comprising:
a package defining an interior, the package having an input for passage of the optical signal from the fiber into the interior; and
a chip, mounted in the interior along the optical path from the input, having a substrate on which the planar mirror, the first electrode, the membrane, the curved mirror, and the second electrode are disposed.

15. The device of claim 14, wherein the package comprises a Transistor Outline (TO) package.

16. The device of claim 14, wherein the input comprises a fiber optic coupling optic or a fiber collimator.

17. The device of claim 14, wherein the input comprises a window or lens on the package.

18. The device of claim 14, wherein the package further comprises an aperture disposed along the optical path.

19. The device of claim 18, wherein the aperture is built into the chip.

20. The device of claim 18, wherein the aperture is built into the substrate.

21. The device of claim 14, wherein the aperture is separated from the chip and the substrate.

* * * * *